(12) United States Patent
Hariharan et al.

(10) Patent No.: US 8,705,655 B2
(45) Date of Patent: Apr. 22, 2014

(54) RESOURCE BLOCK MAPPING FOR SYMBOLS WITH REPETITION

(75) Inventors: Priya Hariharan, Dallas, TX (US); Christian Wengerter, Kleinheubach (DE); Akihiko Nishio, Kanagawa (JP); Alexander Golitschek Edler von Elbwart, Darmstadt (DE)

(73) Assignee: Panasonic Corporation, Osaka (JP)

( * ) Notice: Subject to any disclaimer, the term of this patent is extended or adjusted under 35 U.S.C. 154(b) by 340 days.

(21) Appl. No.: 13/056,621

(22) PCT Filed: Jul. 20, 2009

(86) PCT No.: PCT/EP2009/005260
§ 371 (c)(1),
(2), (4) Date: May 11, 2011

(87) PCT Pub. No.: WO2010/012395
PCT Pub. Date: Feb. 4, 2010

(65) Prior Publication Data
US 2011/0206147 A1     Aug. 25, 2011

(30) Foreign Application Priority Data
Aug. 1, 2008   (EP) .................................... 08013842

(51) Int. Cl.
*H04B 7/06*   (2006.01)
(52) U.S. Cl.
USPC ........................................................ 375/299
(58) Field of Classification Search
USPC ......................................... 375/347, 299, 267
See application file for complete search history.

(56) References Cited

U.S. PATENT DOCUMENTS

| | | | |
|---|---|---|---|
| 2006/0120473 A1 | 6/2006 | Baum | |
| 2008/0304593 A1* | 12/2008 | Khan et al. | 375/267 |
| 2009/0005049 A1 | 1/2009 | Nishio | |
| 2009/0103648 A1* | 4/2009 | Fukuoka et al. | 375/267 |
| 2010/0165926 A1* | 7/2010 | Fukuoka et al. | 370/329 |

FOREIGN PATENT DOCUMENTS

| | | |
|---|---|---|
| WO | 2006/080506 | 8/2006 |
| WO | 2006/117015 | 11/2006 |

OTHER PUBLICATIONS

International Search Report dated May 18, 2010.
European Search Report dated May 27, 2009.
3GPP TS 36.211 V8.3.0, "Evolved Universal Terrestrial Radio Access (E-UTRA); Physical Channels and Modulation (Release 8)," May 2008, pp. 1-77.

(Continued)

*Primary Examiner* — Kevin Kim
(74) *Attorney, Agent, or Firm* — Dickinson Wright PLLC

(57) ABSTRACT

In a mobile communication system with uncorrelated channel characteristics, transmission using modulation of data symbols with repetition can improve the performance. However, mapping of the original and the repeated symbols into the physical resources may on the other hand reduce a desired level of diversity when the original and the corresponding repeated symbols map on the physical resources close to each other. The present invention provides a method for transmission, a transmitter, a method for receiving, and a receiver capable of efficiently transmit/receive data symbols with an increased level of diversity. This is achieved by grouping of portions of the original and the corresponding data symbols and by mapping the portions of the original and the corresponding data symbols into the different physical resource blocks.

18 Claims, 19 Drawing Sheets

(56) References Cited

OTHER PUBLICATIONS

3GPP TS 36.212 V8.3.0, "Evolved Universal Terrestrial Radio Access (E-UTRA); Multiplexing and channel coding (Release 8)," May 2008, pp. 1-48.

3GPP TS 36.213 V8.3.0, "Evolved Universal Terrestrial Radio Access (E-UTRA); Physical layer procedures (Release 8)," May 2008, pp. 1-45.

Japanese Notice of Reasons for Rejection dated Oct. 8, 2013 with English translation.

* cited by examiner

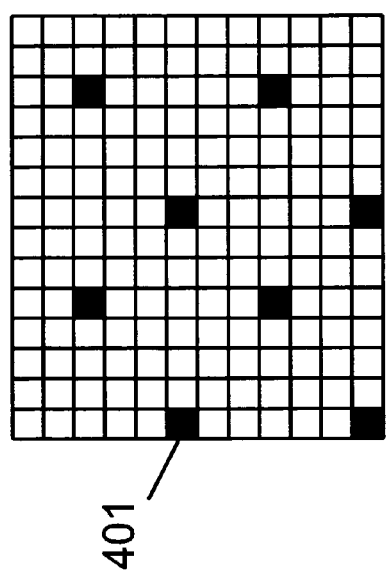
Fig. 4A
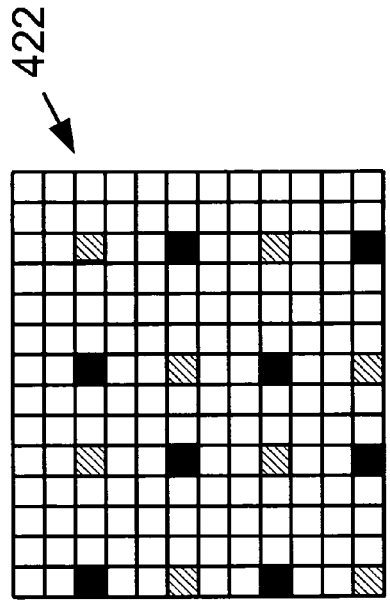
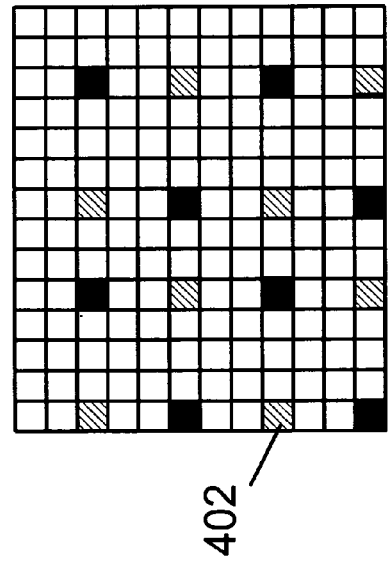
Fig. 4B

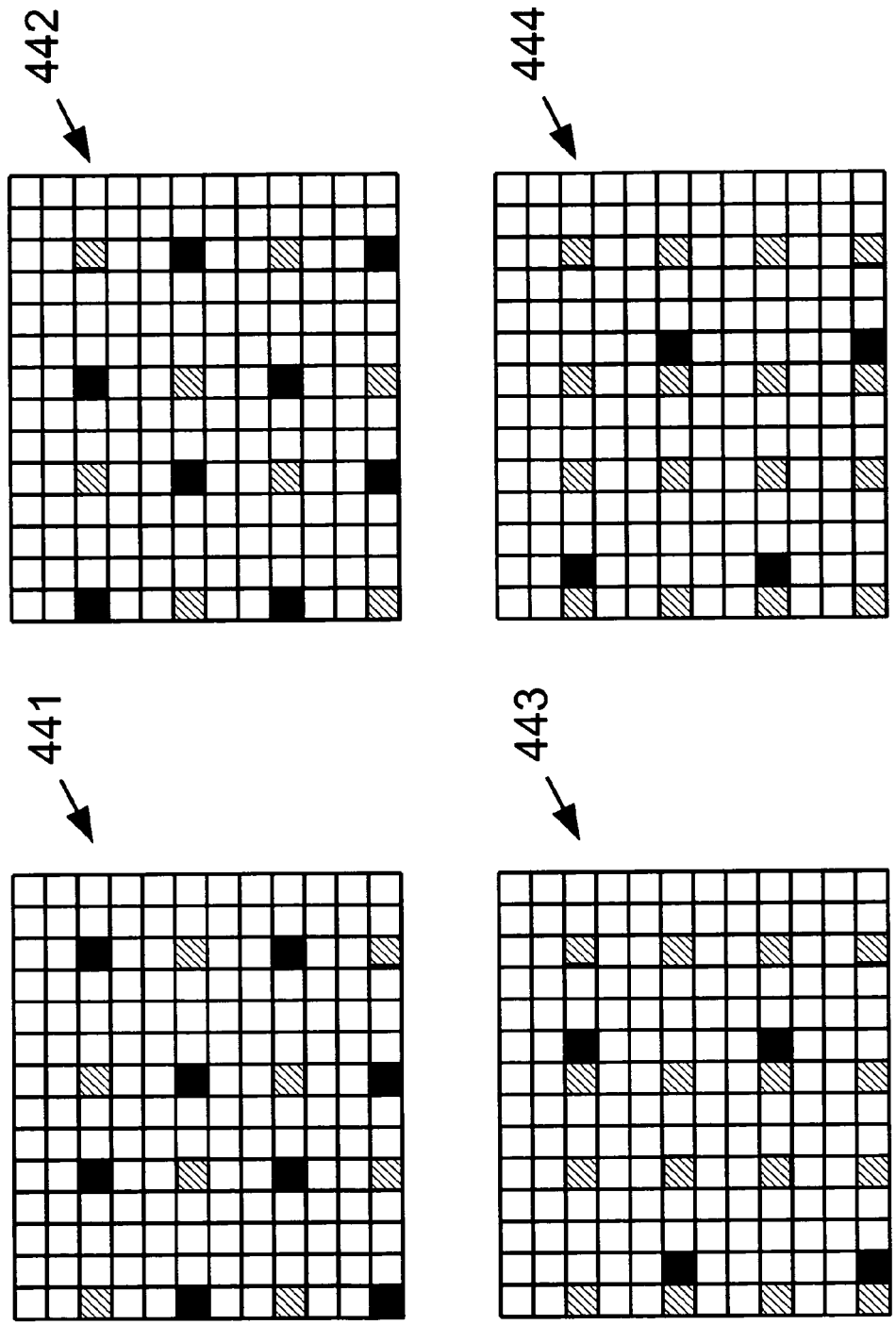

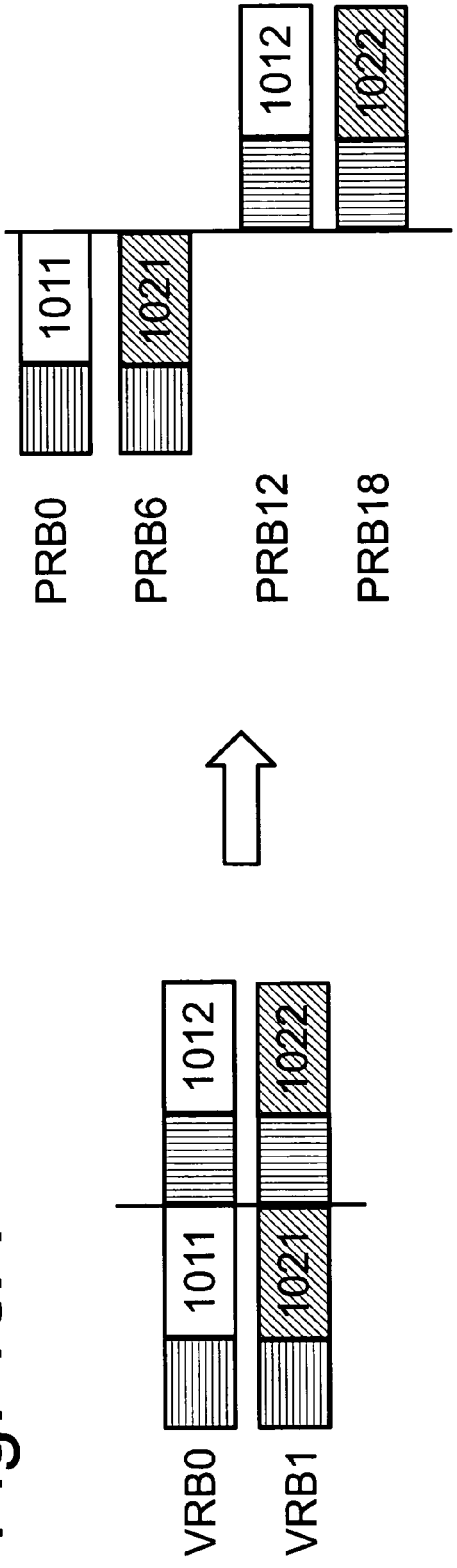
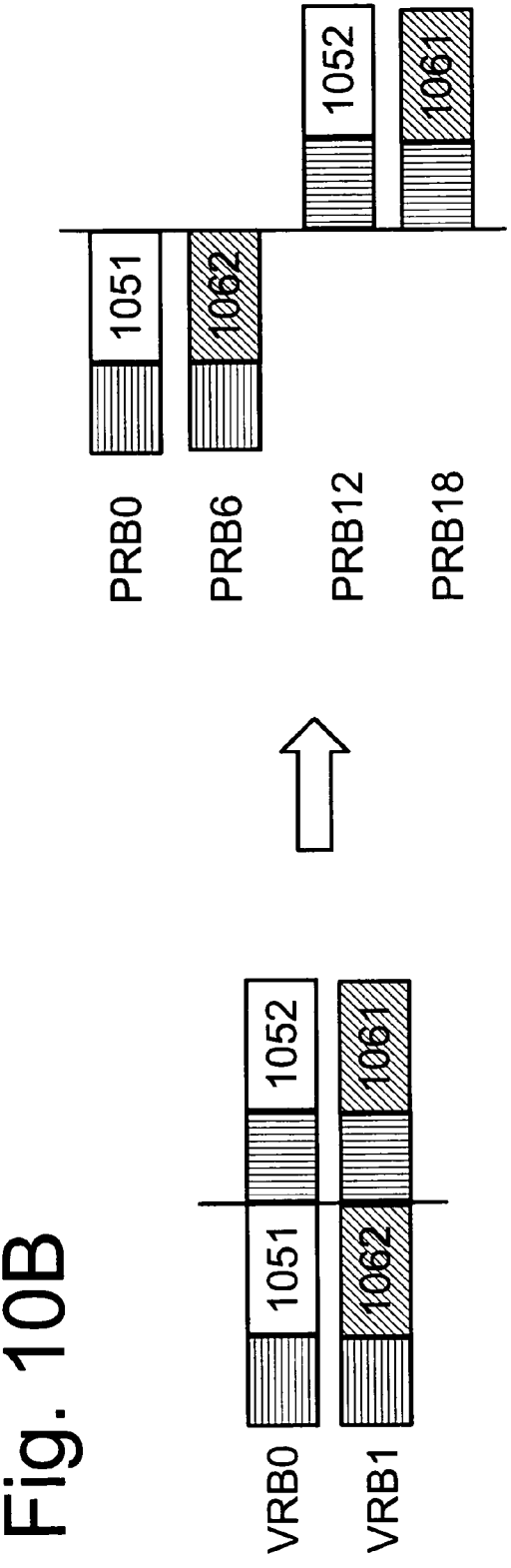

2 control OFDM symbols in slot 1

Note: *Pilot symbols are not shown*

RESOURCE BLOCK MAPPING FOR SYMBOLS WITH REPETITION

The present invention relates to a transmission of symbols with repetition over a mobile communication network, in particular to mapping of the symbols to the system resources.

BACKGROUND OF THE INVENTION

Third-Generation (3G) mobile systems, such as for instance Universal Mobile Telecommunications System (UMTS) standardized within the Third-Generation Partnership Project (3GPP), have been based on Wideband Code Division Multiple Access (WCDMA) radio access technology. Today, the 3G systems are being deployed on a broad scale all around the world. A first step in enhancing this technology entails introducing High-Speed Downlink Packet Access (HSDPA) and an enhanced uplink, also referred to as High Speed Uplink Packet Access (HSUPA), both of them providing an improvement of radio access in spectral efficiency and flexibility compared to plain UMTS.

While HSDPA and HSUPA still take the advantage of the WCDMA radio access technology, the next major step or evolution of the UMTS standard has brought a combination of Orthogonal Frequency Division Multiplexing (OFDM) for the downlink and Single Carrier Frequency Division Multiplexing Access (SC-FDMA) for the uplink. The new study item which has become later a work item has been named "Evolved UMTS Terrestrial Radio Access (UTRA) and UMTS terrestrial Radio Access Network (UTRAN)", abbreviated to E-UTRA and E-UTRAN and often referred to as Long-Term Evolution (LTE) since it is intended to cope with future technology evolutions.

The target of LTE is to achieve significantly higher data rates compared to HSDPA and HSUPA, to improve the coverage for the high data rates, to significantly reduce latency in the user plane in order to improve the performance of higher layer protocols (for example, TCP), as well as to reduce delay associated with control plane procedures such as, for instance, session setup. Focus has been given to the convergence towards use of Internet Protocol (IP) as a basis for all future services, and, consequently, on the enhancements to the packet-switched (PS) domain.

A radio access network is, in general, responsible for handling all radio-access related functionality including scheduling of radio channel resources. The core network may be responsible for routing calls and data connections to external networks. In general, today's mobile communication systems (for instance GSM, UMTS, cdma200, IS-95, and their evolved versions) use time and/or frequency and/or codes and/or antenna radiation pattern to define physical resources. These resources can be allocated for a transmission for either a single user or divided to a plurality of users. For instance, the transmission time can be subdivided into time periods usually called time slots then may be assigned to different users or for a transmission of data of a single user. The frequency band of such a mobile systems may be subdivided into multiple sub-bands. The data may be spread using a (quasi) orthogonal spreading code, wherein different data spread by different codes may be transmitted using, for instance, the same frequency and/or time. Another possibility is to use different radiation patterns of the transmitting antenna in order to form beams for transmission of different data on the same frequency, at the same time and/or using the same code.

The architecture defined in LTE is called Evolved Packet System (EPS) and comprises apart from E-UTRAN on the radio access side also the Evolved Packed Core (EPC) on the core network side. LTE is designed to meet the carrier needs for high-speed data and media transport as well as providing high capacity voice support to the next decade.

The LTE network is a two-node architecture consisting of access gateways (aGW) and enhanced base stations, so-called eNode Bs (eNB). The access gateways handle core network functions, i.e. routing calls and data connections to external networks, and also implement radio access network functions. Thus, the access gateway may be considered as combining the functions performed by Gateway GPRS Support Node (GGSN) and Serving GPRS Support Node (SGSN) in today's 3G networks and radio access network functions, such as for example header compression, ciphering/integrity protection. The eNodeBs handle functions such as for example Radio Resource Control (RRC), segmentation/concatenation, scheduling and allocation of resources, multiplexing and physical layer functions. E-UTRAN air (radio) Interface is thus an interface between a User Equipment (UE) and an eNodeB. Here, the user equipment may be, for instance, a mobile terminal, a PDA, a portable PC, a PC, or any other apparatus with receiver/transmitter conform to the LTE standard. The described architecture is exemplified in FIG. 19.

Multi carrier transmission introduced on the E-UTRAN air interface increases the overall transmission bandwidth, without suffering from increased signal corruption due to radio-channel frequency selectivity. The proposed E-UTRAN system uses OFDM for the downlink and SC-FDMA for the uplink and employs MIMO with up to four antennas per station. Instead of transmitting a single wideband signal such as in earlier UMTS releases, multiple narrow-band signals referred to as "subcarriers" are frequency multiplexed and jointly transmitted over the radio link. This enables E-UTRA to be much more flexible and efficient with respect to spectrum utilization.

In 3GPP LTE, the following downlink physical channels are defined (3GPP TS 36.211 "Physical Channels and Modulations", Release 8, v. 8.3.0, May 2008, available at http://www.3gpp.org and incorporated herein by reference):

Physical Downlink Shared Channel (PDSCH)
Physical Downlink Control Channel (PDCCH)
Physical Broadcast Channel (PBCH)
Physical Multicast Channel (PMCH)
Physical Control Format Indicator Channel (PCFICH)
Physical HARQ Indicator Channel (PHICH)

The PDSCH is utilised for data and multimedia transport and hence designed for high data rates. The PDSCH is designed for the downlink transport, i.e. from eNode B to at least one UE. In general, this physical channel is separated into discrete physical resource blocks and may be shared by a plurality of UEs. The scheduler in eNodeB is responsible for allocation of the corresponding resources, the allocation information is signalised. The PDCCH conveys the UE specific control information.

The general baseband signal processing in LTE is shown in FIG. 1 (3GPP TS 36.211 "Multiplexing and Channel Coding", Release 8, v. 8.3.0, May 2008, available at http://www.3gpp.org and incorporated herein by reference). First, information bits which contain the user data or the control data are block-wise encoded (channel coding by a forward error correction such as turbo coding). The blocks of encoded bits are then scrambled 110. By applying different scrambling sequences for neighbouring cells in downlink, the interfering signals are randomized, ensuring full utilisation of the processing gain provided by the channel code. The blocks of scrambled bits, which form symbols of predefined number of bits depending on the modulation scheme employed, are transformed 120 to blocks of complex modulation symbols using the data modulator. The set of modulation schemes supported by LTE downlink includes QPSK, 16-QAM and 64-QAM corresponding to two, four or six bits per modulation symbol Layer mapping 130 and precoding 140 are related to Multiple-Input/Multiple-Output (MIMO) applications supporting more receiving and/or transmitting antennas. LTE supports up to four transmitting antennas. The antenna mapping can be configured in different ways to provide multi antenna schemes including transmit diversity, beam forming, and spatial multiplexing. The set of resulting symbols to be transmitted on each antenna is further mapped 150 on the resources of the radio channel, i.e., into the set of resource blocks assigned for particular UE by a scheduler for transmission. The selection of the set of resource blocks by the scheduler depends on the channel quality indicator (CQI)—a feedback information signalized in the uplink by the UE and reflecting the measured channel quality in the downlink. After mapping of symbols into the set of physical resource blocks, an OFDM signal is generated 160 and transmitted. The generation of OFDM signal is performed using inverse discrete Fourier transformation.

The physical resources for the OFDM transmission are often illustrated in a time-frequency grid wherein each column corresponds to one OFDM symbol and each row corresponds to one OFDM subcarrier, the numbering of columns thus specifying the position of resources within the time domain, and the numbering of the rows specifying the position of resources within the frequency domain.

FIG. 2 illustrates the time domain structure for LTE transmission. The radio frame 230 has a length of $T_{frame}=10$ ms, corresponding to the length of a radio frame in previous UMTS releases. Each radio frame further consists of ten equally sized subframes 220 of the equal length $T_{subframe}=1$ ms. Each subframe 220 further consists of two equally sized time slots (TS) 210 of length $T_{slot}=0.5$ ms. Each slot finally consists of a number of OFDM symbols including a cyclic prefix of predefined length. Here, the OFDM symbol refers to a symbol to be transmitted, being formed by the inverse discrete Fourier transformation of a column in the resource grid, consisting of subcarrier symbols to be transmitted within one time interval. Prefix of an OFDM symbol has a function of separating the OFDM symbols in order to cope with the inter-symbol interference. LTE standard defines cyclic prefixes with two different lengths, a normal cyclic prefix and an extended cyclic prefix. According to the length of the prefix, for the subcarrier spacing of 15 kHz there are either seven or six OFDM symbols per slot, respectively.

The time-frequency grid of subcarriers and OFDM symbols for one time slot TS0 210 in downlink is illustrated in FIG. 3. A smallest time-frequency resource corresponding to a single subcarrier of an OFDM symbol is referred to as a resource element 310. The downlink subcarriers are further grouped into physical resource blocks (PRB) 320. Each physical resource block 320 consists of twelve consecutive subcarriers which form a so-called subband and span over the 0.5 ms slot 210 with the specified number of OFDM symbols. Such subband occupies a bandwidth of 180 kHz.

In order to estimate the downlink channel in case of the OFDM transmission, reference signals (pilots) are regularly inserted into the time-frequency grid. These symbols are referred to as LTE downlink reference signals. FIG. 4 illustrates the distribution of the LTE downlink reference signals 401. Hereby, FIG. 4A shows the LTE downlink reference signals 401 distributions within a subframe for one antenna port 410. FIG. 4B and FIG. 4C show the LTE downlink reference signals 401 for two antenna ports 421, 422, and for four antenna ports 441, 442, 443, 444, respectively. For more than one antenna port, the resource elements 402, the position of which corresponds to the positions of LTE downlink reference signals at another antenna port(s), are not used for transmission. This is because a UE needs to get an accurate Carrier to Interference Ratio (CIR) estimation for each transmitting antenna. Hence when a reference signal is transmitted from one antenna port, the other antenna ports in the cell are idle.

Each LTE resource block consists of 12 subcarriers and a predefined number of OFDM symbols, for instance seven or six, which results in an amount of resource elements (in this example case 84 or 72, respectively). However, from this amount of resource elements only a subset may be used for the transmission of the data. Some resources are reserved for the LTE downlink reference signals as can be seen in FIG. 4. Another portion is used for layer 1 (L1) and layer 2 (L2) control signalling.

In LTE, the L1/L2 control signals are mapped to the first n OFDM symbols of a subframe, wherein n is more than or equal to 1 and is less than or equal to three. Transmitting of the L1/L2 control signals in the beginning of the subframe has the advantage of early decoding of the corresponding L1/L2 control information included therein. Thus, there is no mixing of control signalling and data within an OFDM symbol. Consequently, the subframe 220 consists of two time slots TS0 and TS1. The first time slot TS0 carries both control and data OFDM symbols. The second time slot TS1 then only carries the data symbols. Hence the number of resource elements available for data in the first time slot TS0 depends on the number of control OFDM symbols. Furthermore, the number of resource elements available for data in both first and second time slots depends on the number of LTE downlink reference signals.

The resource mapping 150 of modulation symbols onto the resources of the radio channel after modulation mapping 120 and possibly layer mapping 130 and precoding 140, is performed by first forming a Virtual Resource Block (VRB). For each antenna port used for transmission of a physical channel, the block of complex valued symbols is mapped to resource elements first in the order of frequency (filling rows of a column) and then in the time order (filling columns) as can be seen in FIG. 5. A pair of virtual resource blocks represents the smallest resource portion that can be addressed by the scheduler. It has the size and structure of a subframe including the first and the second time slot. A pair of virtual resource blocks is then mapped onto a pair of physical resource blocks.

The following two types of virtual resource blocks are defined according to their mapping on the physical resource blocks in LTE downlink:

Localised Virtual Resource Block (LVRB)

Distributed Virtual Resource Block (DVRB)

In the localised transmission mode using the localised VRBs, adjacent physical resource blocks are assigned for the transmission to a single user equipment. In the distributed transmission mode using the distributed VRBs, the physical resource blocks carrying data for the same UE are distributed across the frequency band.

In order to exploit multi-user diversity and to achieve scheduling gain in frequency domain, the data for a given user should be allocated on resource blocks on which the users have a good channel conditions. Typically, those resource blocks are close to each other and therefore, the localised mode is preferred. The pairs of VRBs of the localised type are mapped directly to the pairs of PRBs.

The distributed VRBs are adapted to utilise diversity gain when frequency selective scheduling is not appropriate for UEs. In order to maximise the diversity level of allocating multiple contiguous distributed VRBs to a single UE, the distributed VRBs are mapped on well-separated physical resource blocks.

For both types of VRBs pairs—localized and distributed—a subframe is addressed together by a single VRB number as shown in FIG. 5. VRB pairs are numbered from 0 to the number of allocated downlink resource blocks minus one. The desired frequency gap varies and is predefined depending on the system bandwidth (3GPP TS 36.213 "Physical Layer Procedures", Release 8, v. 8.3.0, May 2008, available at http://www.3gpp.org and incorporated herein by reference). FIG. 5 shows an example of mapping of pairs of distributed virtual resource blocks into the pairs of physical resource blocks for a 5 MHz system bandwidth. For instance, in case of a 5 MHz LTE system, the system bandwidth consists of 24 PRBs in frequency. The frequency gap Ngap between the pair of the physical resource blocks on which a distributed virtual resource block pair is mapped is 12 physical resource blocks as can be seen in the PRBs grid 500. This frequency gap provides sufficient frequency diversity. In this example, two pairs VRB0 and VRB1 of VRBs have been allocated for a transmission to a UE. The first time slot TS0 of VRB0 is mapped on the first time slot TS0 of the first PRB in 500. The second time slot TS1 of the VRB0 is then mapped on the second time slot of the $13^{th}$ PRB. Similarly, the first time slot of the VRB1 is mapped on the first time slot of the seventh PRB and the second time slot of the VRB1 is mapped on the second time slot of the $19^{th}$ PRB. In this way, the frequency gap Ngap of 12 is achieved between the PRBs belonging to a single pair of VRBs. Moreover, the time gap of one time slot corresponding to seven OFDM symbols is achieved. In other words, a distributed VRB pair is hopped at half the system bandwidth. This scheme improves frequency diversity especially for larger system bandwidths.

The situation becomes more complicated if data symbols with repetition are mapped on the physical resources. This is illustrated in FIG. 6. Within a modulation, with symbol repetition of order two, the original data symbols 610 are repeated once obtaining the repeated data symbols 620. The information bits are mapped on to two constellations to obtain original data symbols and repeated data symbols The two constellations could be same or different. Thus, the repeated data symbol does not necessarily result in the same modulation symbol as the original data symbol. According to the above described mapping, the control symbols 630 fill the first n OFDM symbols of the first time slot of the VRB, followed by the original data 610 and the repeated data 620 in the first and the second time slot. The mapping into the physical resource blocks is then performed as described above, namely, the control symbols 630 together with a first portion of the original data symbols 611 are mapped to the first time slot of a first physical resource block PRB0. The rest of the original data symbols 612 is then together with the repeated symbols 620 mapped into the second time slot of a second physical resource block PRB12 with frequency gap of 12 between PRB0 and PRB12. However, due to the mapping of control symbols onto the first OFDM symbols of the first time slot of the VRB, the second time slot mapped on the same PRB (in frequency) now contains both, the original symbols 612 and their repetition. Thus, the desired level of diversity corresponding to the frequency gap of 12 is not achieved for the original and the repeated data symbols. The following Table shows the degree of achieving the desired frequency gap between the original and the repeated symbols with respect to this resource-mapping rule for a 5 MHz system:

| | PRB allocation size | | | | | | | | | |
|---|---|---|---|---|---|---|---|---|---|---|
| | 1 | 2 | 3 | 4 | 5 | 6 | 7 | 8 | 9 | 10 |
| Frequency diversity [%] | 84.05 | 78.20 | 63.70 | 58.00 | 56.00 | close to or less than 50 | | | | |

The degree of achieving the desired frequency gap of 12 between each pair of original and repeated data symbols has been obtained for all symbol pairs. The level of frequency diversity decreases with the increasing allocation size. Here, the allocation size refers to a number of PRB pairs allocated for the transmission. The time diversity in terms of distance in OFDM symbols between the data symbols also depends on the allocation size. The reduced diversity level results in the reduction of the system performance in terms of BLock Error Rate (BLER).

SUMMARY OF THE INVENTION

The aim of the present invention is to overcome the above-mentioned problems and to provide a method for transmitting, a method for receiving, a transmitter, and a receiver that enable efficient transmission of data symbols with repetition by increasing the level of diversity between the original and repeated data symbols.

This is achieved by the features of the independent claims.

Advantageous embodiments of the present invention are subject matter of the dependent claims.

It is the particular approach of the present invention to subdivide the data symbols with repetition into groups. The data symbols include original data symbols and repeated data symbols. Here, the repeated data symbols correspond to the original data symbols. Each group comprises a first portion which is formed by the original data symbols and a second portion which is formed by the repeated data symbols corresponding to the original data symbols from the first portion. Then, the data symbols of each portion of a group are mapped into different physical resource blocks.

As a consequence of the grouping and mapping, the corresponding original and repeated data symbols are mapped to different physical resource blocks. Thus, even in the case where the number of resource elements available for mapping of the data symbols differs for the two physical resource blocks forming a pair, it is possible to improve diversity for the original and the corresponding repeated data symbols. The increased diversity level typically results in an improved BLER and consequently in a better performance of the entire system.

According to a first aspect of the present invention, a method is provided for transmitting a block of symbols within a plurality of physical resource blocks of a wireless channel in a mobile communication system. The block of symbols comprises data symbols; the data symbols include original data symbols and repeated data symbols. The repeated data symbols correspond to the original data symbols. The physical resource block is specified by at least one of transmission slot, subband frequency, code and radiation pattern. First, the data symbols are subdivided into a plurality of groups. A group includes a first portion of the original data symbols and a second portion of the corresponding repeated data symbols. Then, the data symbols of each portion of a group are mapped into different physical resource blocks.

According to another aspect of the present invention, a transmitter is provided for transmitting a block of symbols using a plurality of physical resource blocks of a radio channel in a mobile communication system. The block of symbols comprises data symbols which include original data symbols and repeated data symbols. Each repeated data symbol corresponds to an original data symbol. The physical resource block is specified by a subset of transmission slot, subband frequency, code, and radiation pattern. The transmitter comprises a grouping unit and a resource mapper. The grouping unit is capable of subdividing the data symbols into a plurality of groups. Each such group includes a first portion of the original data symbols and a second portion of the corresponding repeated data symbols. The resource mapper is capable of mapping the data symbols of each portion of a group into different physical resource blocks.

According to yet another aspect of the present invention, a method is provided for receiving a block of symbols transmitted using a plurality of physical resource blocks of a radio channel in a mobile communication system. The block of symbols include data symbols, the data symbols include original data symbols and corresponding repeated data symbols. The physical resource block is specified by at least one of transmission slot, subband frequency, code and radiation pattern. First, the data symbols are demapped from different physical resource blocks. Each such resource block includes at least one of a first portion of the original data symbols and a second portion of the repeated data symbols. A first portion of the original data symbols is then grouped with a second portion of the corresponding repeated data symbols in a group. In this way, a plurality of groups is formed. Finally, the original data symbols and the repeated data symbols of a plurality of groups are merged into original data symbols and repeated data symbols.

According to yet another aspect of the present invention, a receiver is provided for receiving a block of symbols transmitted using a plurality of physical resource blocks of a radio channel in a mobile communication system. The block of symbols comprises data symbols which include corresponding original data symbols and repeated data symbols. The physical resource block is specified by at least one of transmission slot, subband frequency, code and radiation pattern. The receiver comprises a demapper for extracting the data symbols from different physical resource blocks. Each resource block includes at least one of a first portion of the original data symbols and a second portion of the repeated data symbols. The receiver further comprises a grouping unit for grouping a first portion of the original data symbols with a second portion of the corresponding repeated data symbols in a group. The receiver also comprises a regrouping unit for merging the original data symbols and the repeated data symbols from a plurality of groups into original data symbols and repeated data symbols.

Preferably, the corresponding original and repeated data symbols mapped to different physical resource blocks achieve a predefined level of diversity.

Preferably, the level of diversity is specified as a distance between the repeated data symbols and their corresponding original symbols within the resource space. In particular, the distance may be given in term of a frequency gap between the original and the corresponding repeated data symbols. The diversity may also be specified within the time domain as number of symbols in time or number of time slots separating the original and the corresponding repeated data symbols. The diversity level can also be specified for any other resources such as codes or radiation pattern.

According to an embodiment of the present invention, the block of symbols further comprises at least one control symbol which is mapped on the same physical resource block as the first portion of the original data symbols of one of the plurality of groups. However, the block of symbols may also contain for example data symbols only, the control symbol(s) may be transported in another way or there may be no need to transport control symbols at all. The particular configuration may be specific for the mobile communication system employed. The mobile communication system may be one of the standardized systems, a system evolved from one of the standardized system, a new system to be standardized or any proprietary mobile communication system.

The block of symbols may additionally or alternatively to the at least one control symbol contain at least one reference signal (also known as pilot signal or pilot symbol), the value of which is known at the receiver and that serves for the estimation of the channel characteristics. The distribution of such reference signals may be given by a standard or signalized.

Preferably, the number of the data symbols in the one of the plurality of groups is determined according to the number of the control symbols, which may be in this case one or a plurality. In particular, one of the physical resource blocks may consist only of the mapped control symbol(s) and/or reference signals, and the mapped first portion of the original data symbols of said one of the plurality of groups. Accordingly, the number of the data symbols in the one of the plurality of groups, i.e. the size of the group, can be determined as twice the number of the original data symbols that can fit into the physical resource block with the control symbol(s) already mapped thereon and/or the reference signal(s) being placed in predefined positions within the physical resource block. Alternatively, the number of the data symbols in the one of the plurality of groups can be determined as any other function of the number of control symbols and/or the pilot symbols.

Preferably, the repeated data symbols of the second portion mapped into a second physical resource block are ordered in the same way as the corresponding original data symbols of the first portion mapped into a first physical resource block. This ensures after the mapping into the physical resource blocks the same diversity value between the original and the repeated data symbols belonging to the same group.

In addition or alternatively, the repeated data symbols in the second physical resource block start at the same position within the second physical resource block as the original data symbols within the first physical resource block. The same position here refers, in particular, to a position within resource block, i.e. in the time domain and in the frequency domain.

In accordance with an embodiment of the present invention, each portion of each group is mapped into different physical resource blocks. Preferably, the number of groups is determined according to the number of physical resource blocks allocated for the transmission. In particular, the number of groups is equal to or smaller than the half of the allocated physical resource blocks plus one.

Preferably, the radio channel uses Orthogonal Frequency Division Multiplexing (OFDM). In particular, a physical resource block is defined by a time slot and by a predefined number of subcarriers. One of the mobile systems using OFDM is the 3GPP Long Term Evolution (LTE) system. In particular, the radio channel is a downlink shared channel, for instance, that defined in LTE standard. For the LTE system, the present invention is of high benefit. In particular, the transmitter in accordance with the present invention may comprise a radio transmission unit capable of processing and transmitting the data based on OFDM technology. Such radio transmission unit may be conform to process and to transmit data in conformance with a standardized mobile communication system, such as 3GPP LTE. Similarly, the receiver in accordance with the present invention may comprise a radio receiving unit capable of receiving and processing the data based on OFDM technology. The radio receiving unit may, for instance, work in conformance with a standardized mobile communication system such as 3GPP LTE.

Preferably, the first portion and the second portion of a first group are mapped into different time slots. This ensures for the original and the corresponding repeated symbols achieving of the time domain diversity according to the gap between the slots on which there are mapped and according to their ordering within the resource block.

Moreover, the first portion and the second portion of the remaining groups (other than the first group) of the plurality of groups are mapped into the same time slots.

The present invention is particularly advantages when distributed mapping of virtual resource block pairs onto physical resource blocks pairs is applied. Accordingly, each pair of virtual resource blocks includes a first virtual resource block in a first time slot and a second virtual resource block in a second time slot. Moreover, each pair of virtual resource blocks is addressed by a common index in frequency domain. The first virtual resource block is mapped on a first physical resource block and the second virtual resource block is mapped on a second physical resource block. The first and the second physical resource blocks are separated in frequency by a predefined frequency gap and are mapped into different time slots. The position of the physical resource blocks, on which a pair of virtual resource blocks is mapped, may be predefined by a standard. Such distributed mapping is agreed, for instance, in the LTE system.

For a system using the distributed mapping of virtual resource block pairs onto physical resource blocks pairs, the groups may be first mapped to the virtual resource blocks in such a manner that after the distributed mapping, the two portions of a group are mapped to different physical resource blocks and that the desired level of diversity between the original and the corresponding repeated symbols is met.

In particular, the first portion of the original data symbols of a first group is mapped into the first virtual resource block of a first virtual resource block pair. The second portion of the repeated data symbols of the first group is mapped into the second virtual resource block of the virtual resource block pair. Thus, the first time slot of the virtual resource pair contains the original data and the second time slot of the virtual resource pair contains the corresponding repeated data. After applying the distributed mapping onto physical resource blocks, the two time slots of the virtual resource pair are mapped onto two physical resource blocks separated by a predefined frequency gap.

In addition or alternatively, the first portion of the original data symbols of a second group is mapped into the second virtual resource block of a first virtual resource block pair and the second portion of the repeated data symbols of the second group is mapped into the second virtual resource block of a second virtual resource block pair. In this configuration, a group other than the first group is mapped entirely into the second time slot of the virtual resource block pair. Preferably, the two virtual block pairs are chosen such that after the distributed mapping, the second virtual blocks of the pairs map onto physical resource blocks separated by a predefined frequency gap.

Moreover, the first portion of the original data symbols of a third group are mapped into the same second virtual resource block as the first portion of the original data symbols of the second group. In this way, a second virtual resource block contains possibly split first portions of the original data symbols.

Preferably, the second portion of the repeated data symbols of a group other than the first group is mapped into the same OFDM symbols as the first portion of the original data symbols of said group. Alternatively, the second portion of the repeated data symbols of a group other than the first group is mapped into a set of OFDM symbols different from the set of OFDM symbols on which the first portion of the original data symbols of said group is mapped. This configuration ensures increased time diversity of the original and repeated data symbols within the second virtual resource block and as a consequence of the distributed mapping, also within the corresponding physical resource block.

In accordance with yet another aspect of the present invention, a computer program product is provided which comprises a computer readable medium having a computer readable program code embodied thereon, the program code being adapted to carry out any embodiment of the present invention.

The above and other objects and features of the present invention will become more apparent from the following description and preferred embodiments given in conjunction with the accompanying drawings, in which:

FIG. 4A is a schematic drawing of an example for distribution of downlink reference signals within the time-frequency grid of LTE for one antenna port.

FIG. 4B is a schematic drawing of an example for distribution of downlink reference signals within the time-frequency grid of LTE for two antenna ports.

FIG. 4C is a schematic drawing of an example for distribution of downlink reference signals within the time-frequency grid of LTE for four antenna ports.

FIG. 10A is a schematic drawing of a first example illustrating mapping of the first region on both time slots of a virtual resource block;

FIG. 10B is a schematic drawing of a second example illustrating mapping of the first region on both time slots of a virtual resource block;

DETAILED DESCRIPTION

The present invention relates to transmitting and receiving of data symbols with repetition over a mobile communication system in an efficient way wherein the desired diversity level between the original data symbols and the repeated data symbols which correspond to the original data symbols is met.

The present invention may be advantageously used for example in connection with a mobile communication system such as the LTE communication system previously described. However, the use of the present invention is not limited to this particular exemplary communication network. It may be advantageous for transmitting and/or receiving of data symbols with repetition over any standardized mobile communication system, any evolved versions of a standardized mobile communication, any future mobile communication systems to be standardized or any proprietary mobile communication system.

The description of LTE specific procedures is intended to better understand the LTE specific exemplary embodiments described herein and should not be understood as limiting the invention to the described specific implementations of processes and functions in the mobile communication network. Similarly, the use of LTE specific terminology is intended to facilitate the description of the key ideas and aspects of the invention but should not be understood as to limit the invention to LTE systems.

Figure 1:
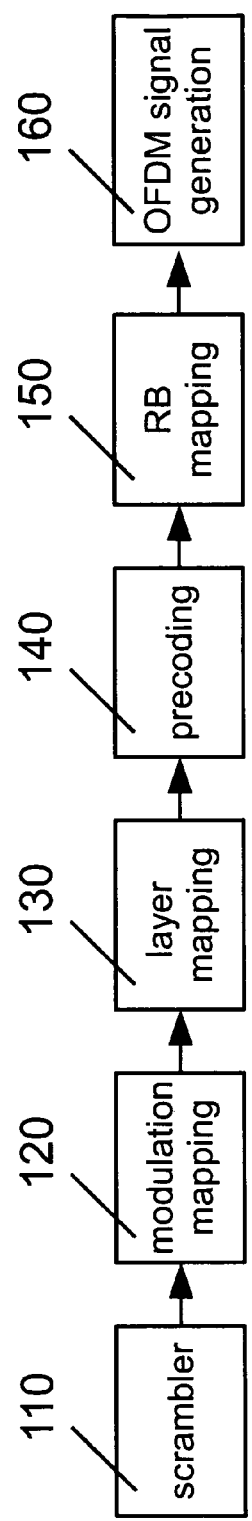
FIG. 1 is a block diagram illustrating downlink baseband processing in LTE system.
Figure 2:
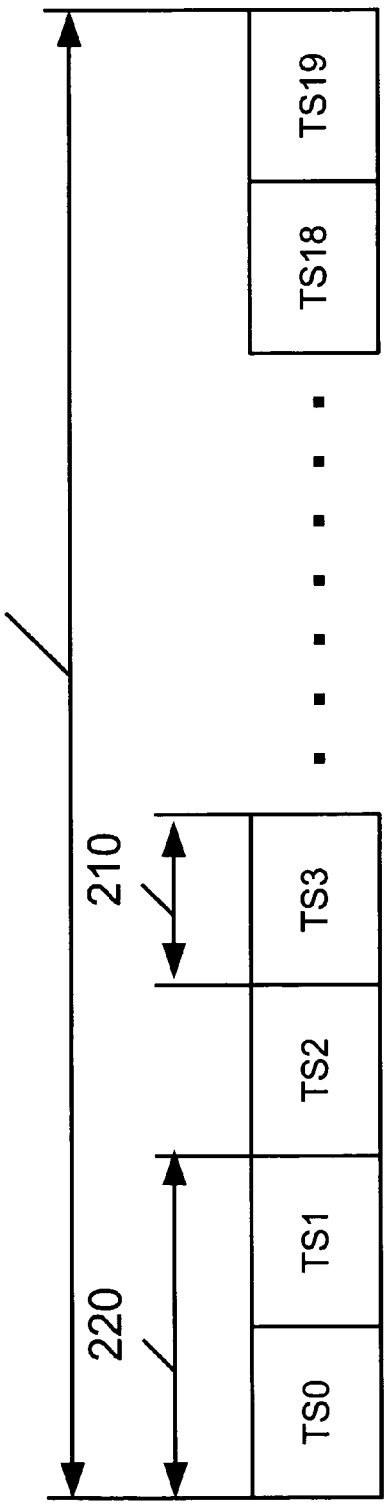
FIG. 2 is an illustration of radio frame structure for LTE system.
Figure 3:
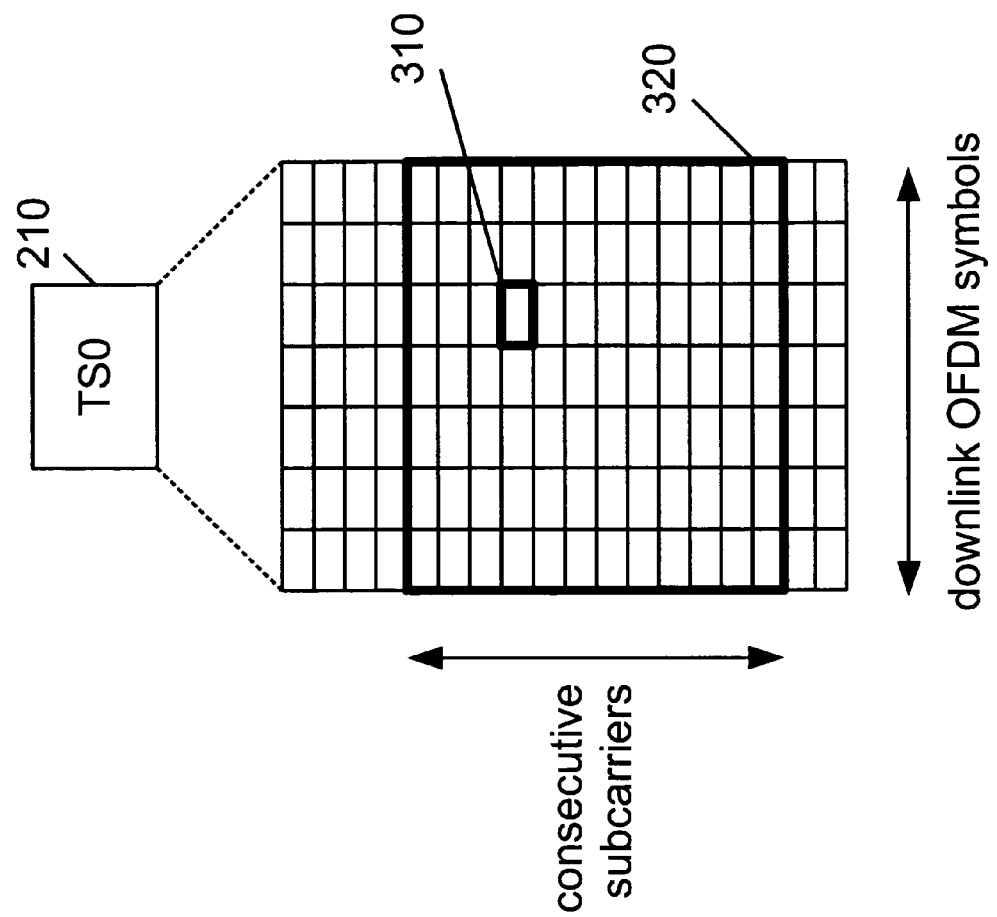
FIG. 3 is an illustration of physical resources in a time-frequency grid for LTE.
Figure 5:
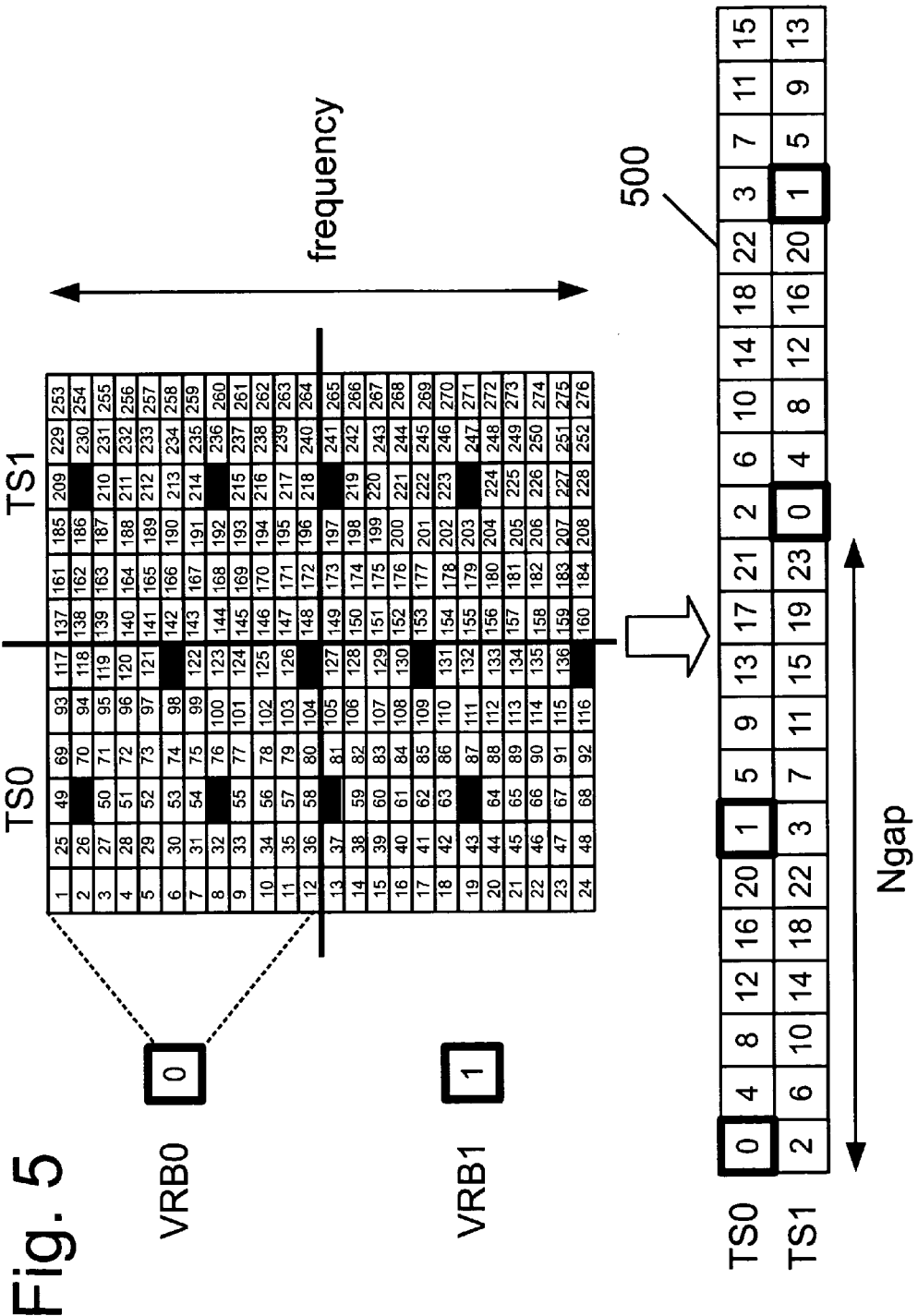
FIG. 5 is an illustration of mapping between virtual and physical resource blocks for distributed transmission mode.
Figure 7:
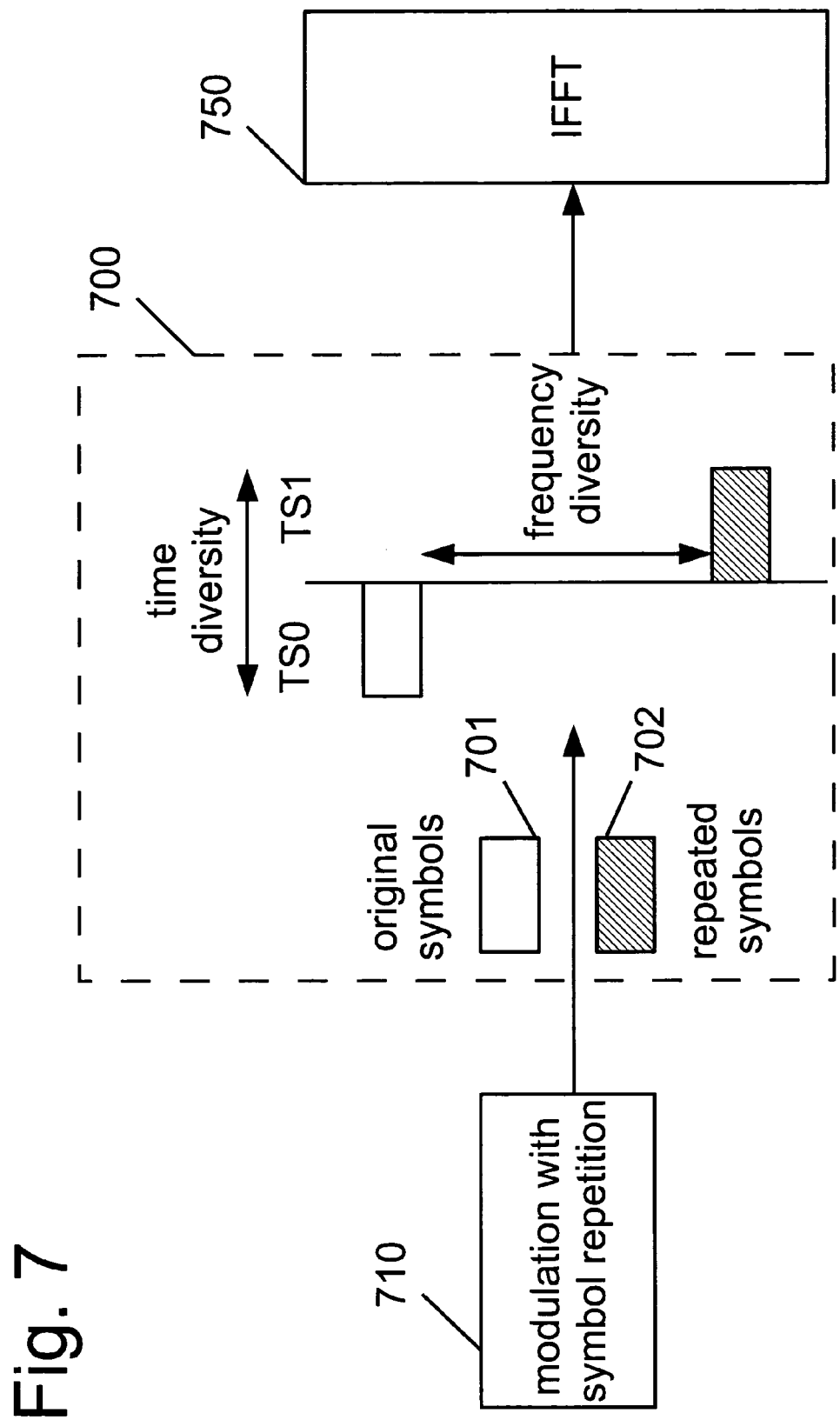
FIG. 7 is a block diagram showing the time diversity and the frequency diversity in mapping of repeated symbols onto physical resource blocks.

The diversity level between the corresponding original and repeated data symbol after their mapping into physical resources reflects a distance between the resource carrying the original data symbol and the resource carrying the repeated data symbol corresponding to the original data symbol. If the quality of the channel in the first resource is low and consequently, the original data symbol cannot be recovered successfully, the repeated data symbol may be recovered if it is mapped in an independent resource. Said distance is defined in the space of resources of the radio channel in the mobile communication system. For instance, as shown in FIG. 5, the distance may correspond to a frequency gap in a mobile communication system that defines resources of the radio channel in different frequency subbands. FIG. 7 schematically exemplifies the frequency diversity and the time diversity in a system with resources being defined by time and frequency, such as for example OFDM systems. In general, in an uncorrelated channel, frequency diversity gain could be achieved when the original and repeated symbols are mapped onto different frequency as illustrated.

Accordingly, after a modulation 710 of the data symbols with repetition, the block of original symbols 701 and the block of the corresponding repeated symbols 702 are mapped 700 to the different time slots TS0 and TS1 and different frequencies. In this way, both time and frequency diversity between the original and the corresponding repeated data symbols are achieved. After the mapping, an OFDM symbol is formed by applying the inverse fast Fourier transformation (IFFT) 750. The time diversity may be measured for instance as a distance in time slots. It can also be measured in a finer scale, for instance in the number of OFDM symbols, if a time slot contains more OFDM symbols. Alternatively, code diversity may be achieved in a system using different spreading codes to separate the physical resources by mapping the original and the corresponding repeated data symbols into different codes. Similarly, in a system supporting spatial multiplexing, different antenna radiation patterns may be used for the transmitting of the original and the corresponding repeated data symbols. The level of diversity may thus define diversity with respect to a single resource domain (for example: time, frequency, code, space) or with respect to a resource space including more domains (time-frequency, time-code, time-frequency-code, or any other combination of the possible resource domains).

The desired level of diversity is predefined, for instance, as a system parameter included within the standard of the mobile communication system, or as a design parameter, and/or defined in dependence on system configuration, it may be fixed or variable and possibly signalized. It may be defined directly as a value of the desired distance between the resources on which the original and the corresponding repeated symbols are mapped. The value may be given, for instance, in physical units or in number of resources or their discrete parts. The value of predefined level of diversity may refer, for instance, to a distance that each pair of original and corresponding repeated symbol must achieve, or to an average value, or to a percentile value, or to a value for particularly chosen data symbols, etc.

Figure 6:
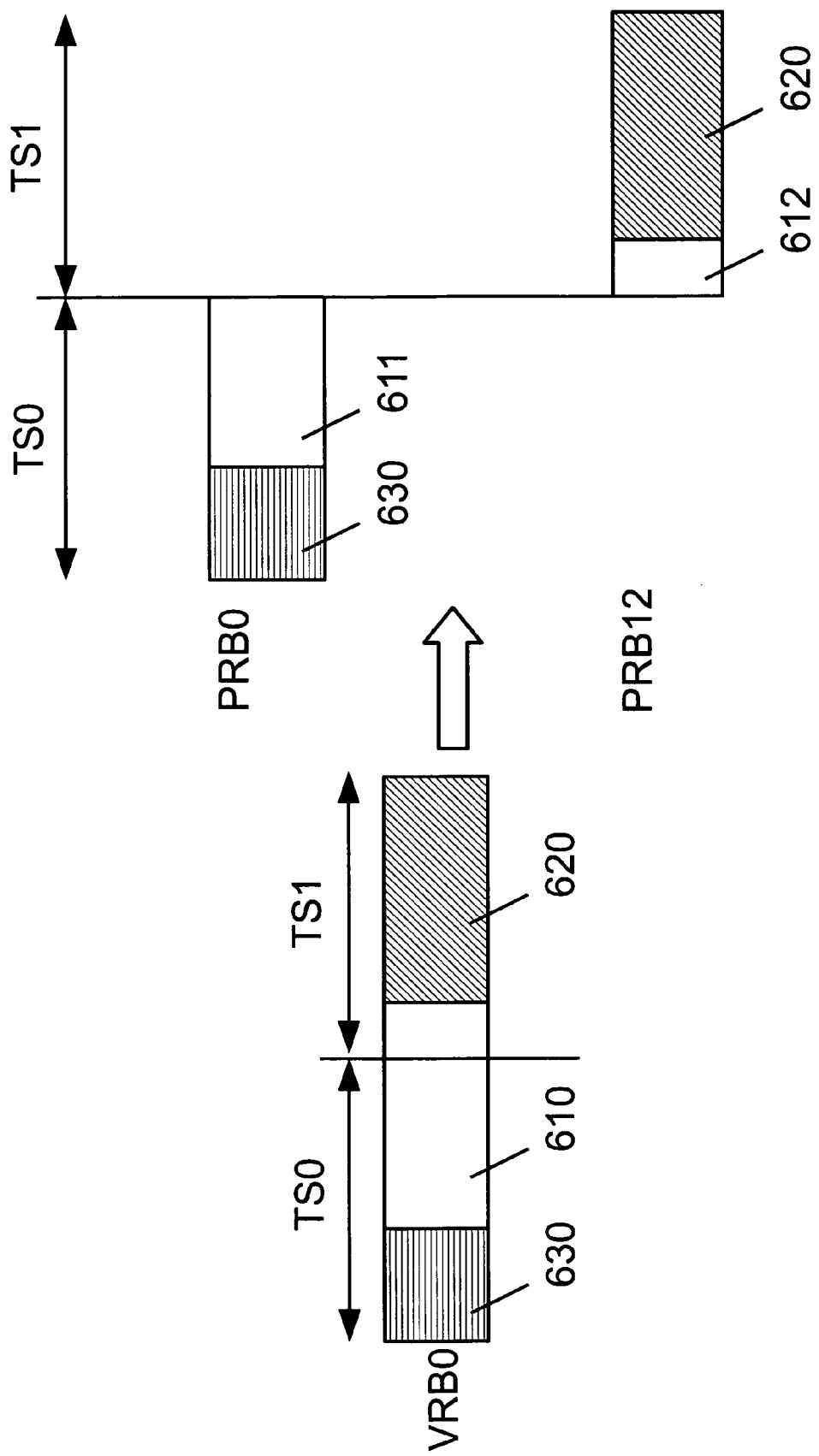
FIG. 6 is a schematic drawing of mapping the modulation symbols with repetition onto physical resource blocks in accordance with the state of the art.
Figure 9:
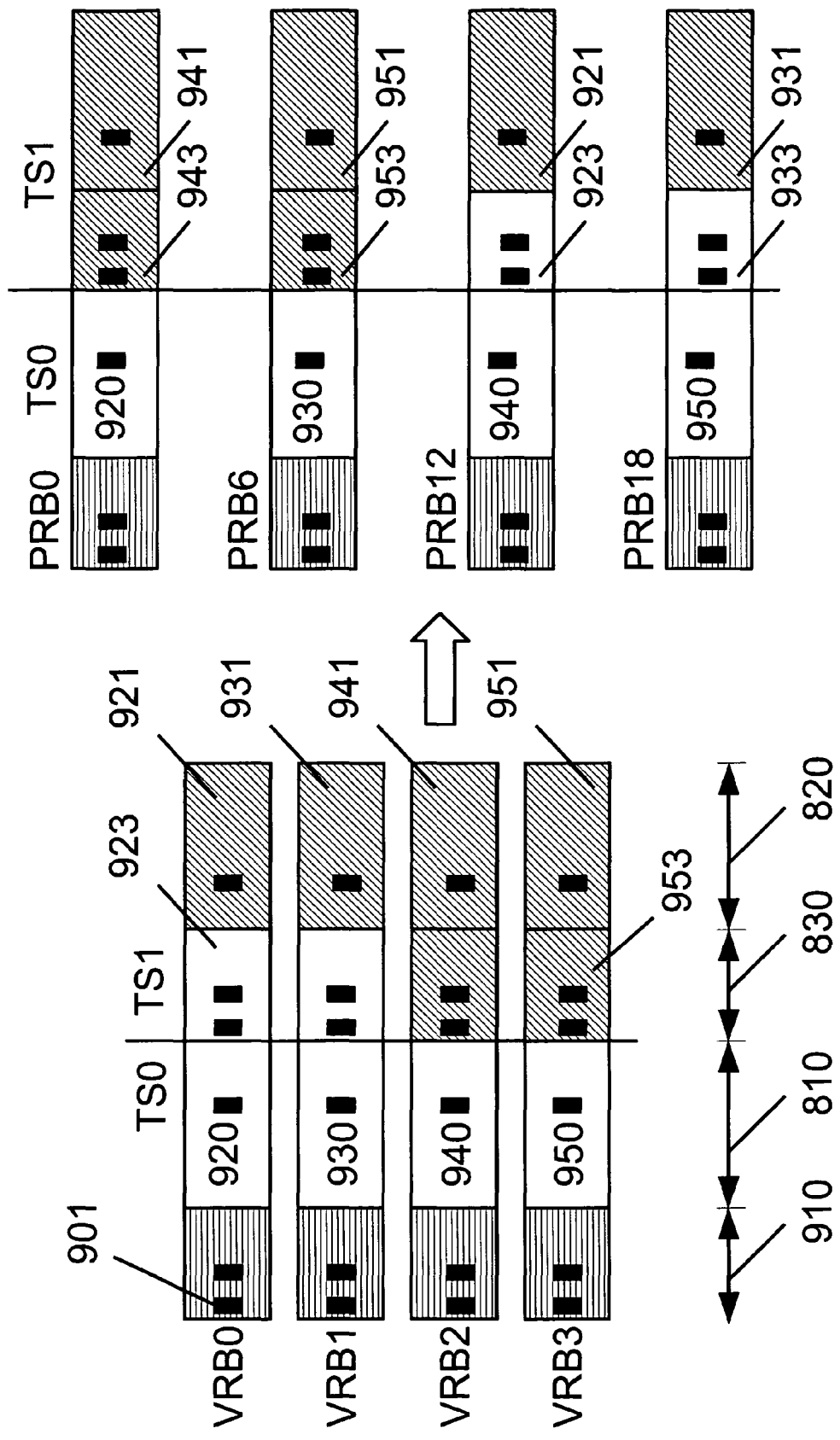
FIG. 9 is a schematic drawing of mapping the virtual resource blocks to the physical resource blocks in accordance an embodiment of the present invention.

The problem of the reduced level of diversity for the symbols with repetition if mapped according to the LTE mapping rule of the distributed virtual resource blocks into the physical resource blocks has already been described with reference to FIG. 6. FIG. 9 illustrates how this problem can be solved in accordance with an embodiment of the present invention.

Figure 8B:
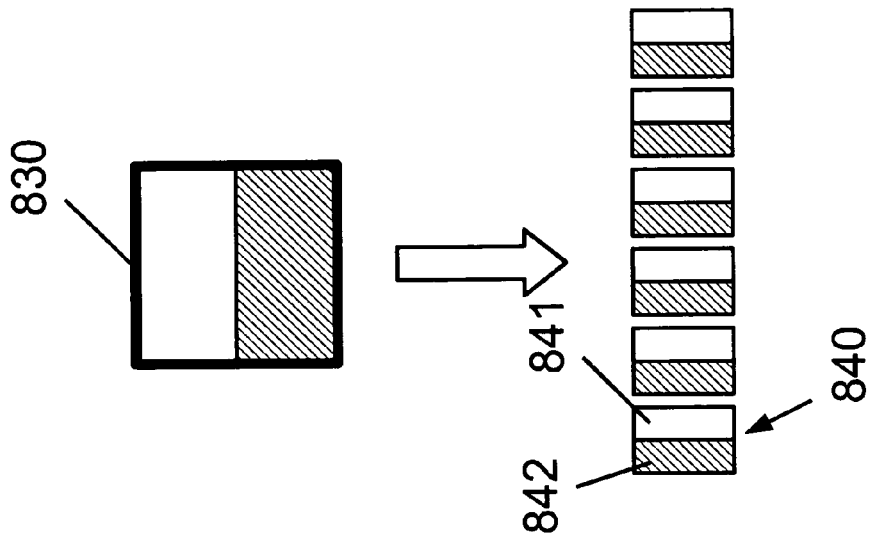
FIG. 8B is a schematic drawing of mixed region interleaving and forming of groups in accordance with an embodiment of the present invention.
Figure 8A:
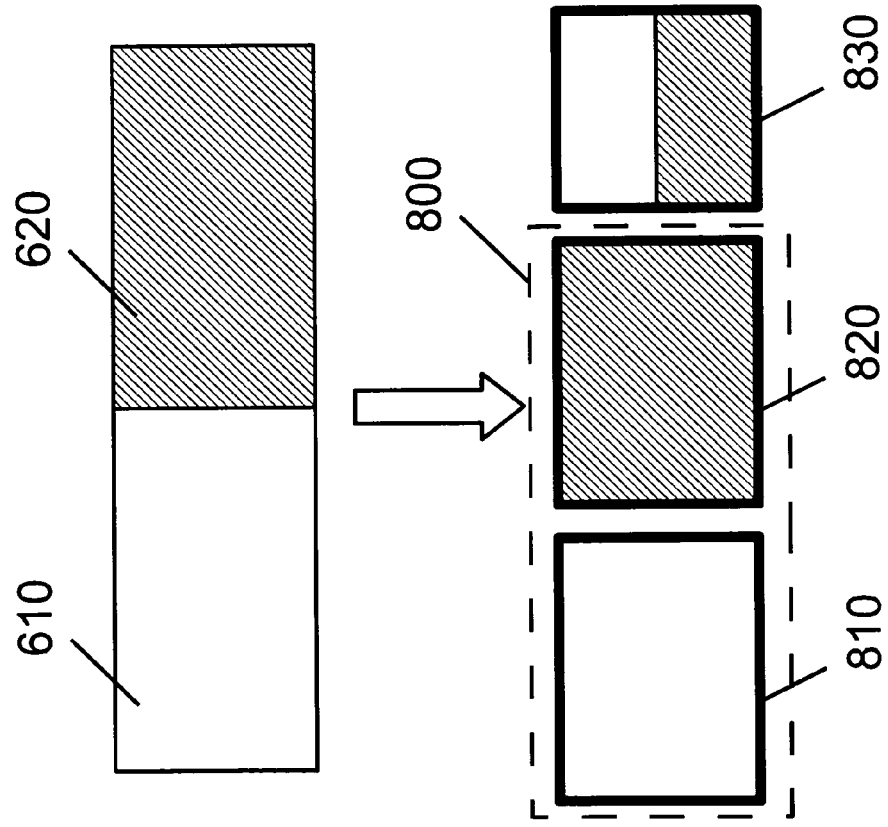
FIG. 8A is a schematic drawing of forming the symbol regions in accordance with the present invention.

FIG. 8A illustrates the general approach of the present invention. First, subdividing of the data symbols 610, 620 into three regions 810, 820, and 830 is performed. The first region 810 and the second region 820 form a first group 800. A first portion of the group 800 corresponds to the first region 810 containing the original data symbols. A second portion of the group 800 corresponds to the second region 820 containing the repeated data symbols. Each repeated data symbol in the second portion corresponds to an original data symbol in the first portion. The third region 830 comprises both original data symbols and the corresponding repeated data symbols that may form a single group or be subdivided into a plurality of groups 840. Each group then contain a first portion 841 of the original data symbols and a second portion 842 of the repeated data symbols as illustrated in FIG. 8B. In each group, the repeated data symbols 842 of the second portion correspond to the original data symbols 841 of the first portion. The appropriate/possible number of groups in the third region depends on the number of PRBs allocated. The size of each group depends on the control overhead and the pilot symbol structure of the resources it is mapped on.

The groups of data symbols are then mapped onto the physical resource blocks. Here, the first portion of the original data symbols and the second portion of repeated data symbols belonging to the same group are mapped to different resource blocks.

It is advantageous to map the corresponding original and repeated data symbols into different physical resource blocks such that they meet a predefined level of diversity.

A possible mapping approach in accordance with the present invention is illustrated in FIG. 9. This mapping approach also allows taking into account the mapping of VRBs onto PRBs in the distributed mode of LTE and preserves its rules.

In FIG. 9, the block of symbols to be mapped on the physical resources also contains control symbols 910. In accordance with an embodiment of the present invention, each virtual resource block starts with control symbol region 910 containing control symbols; in this example case, the control symbols are mapped onto first OFDM symbols, within the resource blocks (both virtual and physical). The figure shows mapping of the three regions to virtual resource block pairs. The first group is formed by the first and the second region. The third region here comprises two other groups, the second group and the third group. In each virtual resource block, after the control symbols 910, following are the first region 810 comprising the first portion 920-950 of the original data symbols of the first group Then a part of the third region 830 follows, containing either the first portion 923, 933 of the original data symbols of the second or the third group or the second portion 943, 953 of the repeated data symbols of the second or the third group. Finally, the second region 820 follows, including the second portion 921, 931, 941, 951 of the repeated data symbols of the first group.

Such mapping to the virtual resource blocks after applying of the state of the art distributed mapping of virtual resource blocks to the physical resource blocks, results in increased diversity in comparison with the prior art mapping scheme. A desired diversity (here given by the desired frequency gap of 12) can be also met for all pairs of the original and corresponding repeated symbols, depending on number of allocated resources.

Reference signals 901 are inserted in a predefined grid in each virtual and corresponding physical resource blocks. As can be seen from FIG. 9, the mapping of the groups as described also results in equal distribution of the pilots within the respective original and repeated data symbol parts, which is not the case for the state of the art mapping as shown in FIG. 6.

The first region and the second region together account for majority of modulation symbols and the third region accounts for remaining minority of modulation symbols.

The design of the three regions comprises defining the contents of the regions and the size of each region, wherein the size of each region depends, for instance, on the control overhead and number of allocated physical resource blocks and/or the number and distribution of the reference signals.

After the three regions have been designed, they are further mapped at a virtual resource block level. The position of the three regions within the virtual resource blocks depends then on the position of control symbols, which are mapped in the first time slot in context of the LTE system.

Based on the design of the three regions and the mapping rules as provided by the present invention, the original and the corresponding repeated data symbols increase diversity when mapped to the physical resource blocks based on the specific distributed virtual resource blocks mapping onto physical resource blocks for LTE.

Here, the problem of asymmetry of resource elements available for mapping of the data symbols with repetition has been caused by the control symbols being inserted into the first of the two virtual resource blocks pair and the first of the corresponding physical resource blocks pair only. In general, the present invention is advantageously applicable to any such asymmetric case regardless its reason.

The data symbols here refer to the data symbols that may be composed of one or more bits and that are mapped on points of a predefined modulation constellation. The data symbols to be mapped may be, for instance, directly the user data, the encoded and/or the scrambled user data.

As an example, LTE in downlink may use a QPSK modulation, which maps data symbols of two bits to a single constellation point. Correspondingly, for instance, 20 data bits results so in 10 QPSK modulation symbols. The same amount of data bits, namely 20, may be alternatively mapped on a 16-QAM modulation. Here, data symbols of 4 bits are mapped to a constellation point, which is a complex number. As a result of such modulation of the 20 data bits, five modulation symbols represented by a complex value are obtained. A repetition of order two may be applied, that additionally maps a repeated data symbol onto the same or a different modulation constellation. In this way, another five 16-QAM modulation symbols are obtained that may be but are not necessarily identical, depending on the choice of the modulation constellations for mapping of the original and the repeated data symbols. Each repeated data symbol here corresponds to an original data symbol. The repeated and the corresponding original data symbols in this example are identical. However, the repeated symbol may also be determined, for instance, by using a particular function upon the original data symbol, such as parity bits calculation or other kind of transformation of the original data symbols.

In both above cases, the QPSK and the 16-QAM with repetition, the number and content of information bits transmitted remains the same as well as the code rate. In a highly uncorrelated channel with no significant power control, no time-frequency diversity schemes, the scenario using 16-QAM with repetition will have a better performance than the scenario using QPSK. If QPSK modulation is employed in a channel with deep fading, the system has to solely rely on the error correction codes. In the scenario using 16-QAM with repetition, since the same symbols are repeated, the probability that both the original and the repeated symbols suffer deep fade simultaneously is lower than in the case of QPSK the probability that the modulation symbol will be affected by fading.

Thus by utilizing modulation mapping with repetition an additional diversity may be achieved which in turn improves the spectral efficiency. The level of diversity achieved depends on the mapping of the original and the repeated data symbols into the physical resources.

The present invention addresses resource mapping for the data symbols with repetition. Even if a repetition order of two is described in this example, another repetition orders may also be applied. The state of the art LTE resource mapping scheme as described above, achieves the desired diversity in the case there is no symbol repetition. However, when the modulation symbols with repetition are mapped to resources using such mapping, not all modulation symbol pairs achieve the desired frequency gap as illustrated in FIG. 6. With such default mapping the first slot of the physical resource blocks pair contains a first portion of the original data symbols only. The second time slot of the physical resource block then contains both the original and the repeated symbols mapped. The degree of achieving the desired frequency gap between the original and the repeated symbols in the prior art resource-mapping rule depends on allocation size. The frequency diversity reduces as the allocation size increases as discussed above.

Theses problems are solved by the present invention. All repeated symbols and original symbols from the first group are mapped onto different frequency resources. The present invention achieves the desired frequency gap between the original and repeated symbols in the system specific VRB mapping rule for distributed transmission also for the original and received data symbols from the remaining group(s), corresponding to the third region. In this manner, the benefits of symbol repetition can be exploited resulting in (almost) all modulation symbols achieve (exceed) the frequency diversity which is the core objective of distributed transmission. Meeting or not of a frequency gap for all modulation symbols depends also on the number of VRBs/PRBs allocated for the transmission. The mapping in accordance with the present invention, however, performs better then the state of the art. Hence, the performance in terms of BLER is also improved.

The three regions may be designed in different ways. The first region may contain only the original data symbols. The size of the first region depends on the control OFDM symbols in the first slot and also the allocated physical resource block size and amount. The second region contains only the repeated symbols corresponding to the original symbols in the first region. The ordering of the repeated symbols in the second region is preferably the same as the ordering of corresponding original symbols in the first region. This ensures efficient mapping such that each (modulated) data symbol in the first region and the corresponding (modulated) data symbol in the second region achieves desired diversity. The third region 830 contains the remaining original and repeated symbols, which are further arranged in a special way. In FIG. 9, the interleave pool (shown as 840 in FIG. 8B for six groups) of two blocks of original symbols and two blocks of corresponding repeated symbols forming two groups. The total number of groups/blocks in the third region depends on the number of PRBs allocated. Size of each group/block of the group depends on the control overhead and the pilot symbol 901 structures. The interleaving ensures original and repeated data symbols in the third region to always achieve frequency gap for the VRB to PRB mapping rule in LTE Rel.8 in all scenarios. In this example, the desired frequency gap is twelve.

After designing the three regions, the regions are mapped to the physical resources. The first region is mapped to a first time slot in the PRB pair. The second region is mapped to a second time slot with the starting OFDM symbol position being the same as the position of the first region in the first time slot. With this rule, all modulation symbols in the second region with all modulation symbols in the first region achieve the desired frequency diversity. In addition, a time diversity of seven OFDM symbols is achieved for the original and the corresponding repeated (modulated) data symbols.

In general, the mapping of the first and the second region may also be exchanged, i.e., the first region may be mapped to the second time slot and the second region may be mapped to the first time slot. Preferably, again, the position of the symbols of the first and the second region within the physical resource block are the same.

Another advantage of the mapping in accordance with the present invention in this example is the identical pilot structure and resource elements for the first and the second region in all scenarios (e.g. multi antenna transmission, usage of normal or extended cyclic prefix) is achieved.

Figure 11:
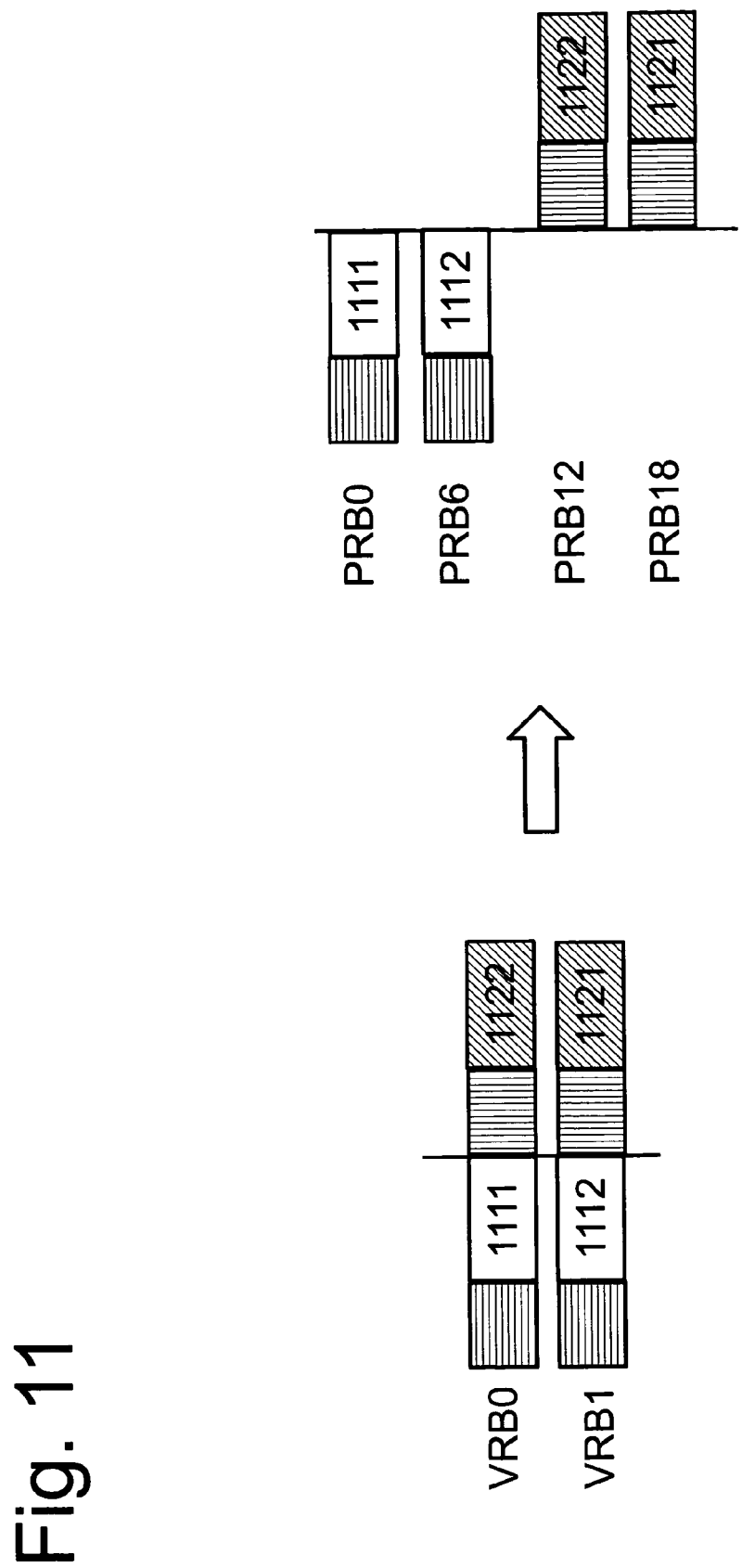
FIG. 11 is a schematic drawing of an example illustrating mapping of the same portion of the third region group on different virtual resource block pair an different time slots.

Each repeated data symbol in the second region is mapped in the same order as the corresponding original data symbol in the first region. This ensures frequency diversity for all system bandwidths defined for the LTE. This also ensures frequency diversity for all modulation symbols in the first and the second region which is not possible when the first and the second region are mapped on the same slot or different VRB pair which results to mapping on the same time slot of the different PRB pair if standard mapping is used as shown in FIGS. 10 and 11. In FIG. 10A, the desired diversity is not achieved between the original and repeated symbols 1011 and 1021, nor between the original and repeated symbols 1012 and 1022. In FIG. 10B, the desired diversity is not achieved between the original and repeated symbols 1052 and 1062. In FIG. 11, the desired diversity is not achieved between the original and repeated symbols 1112 and 1122.

The third region 3 is mapped on the second time slot. Interleaving of groups/blocks of data symbols in the third region as shown in FIG. 9 introduces the spacing of two virtual resource blocks between the original and the repeated blocks of symbols (i.e. between the first and the second portion of each group). This guarantees frequency gap between original and repeated symbols in the third region when mapped onto the physical resource blocks using the VRB-to-PRB mapping rule agreed for LTE distributed transmission mode. If the third region is not interleaved, few pairs of symbols achieve diversity.

Figure 12:
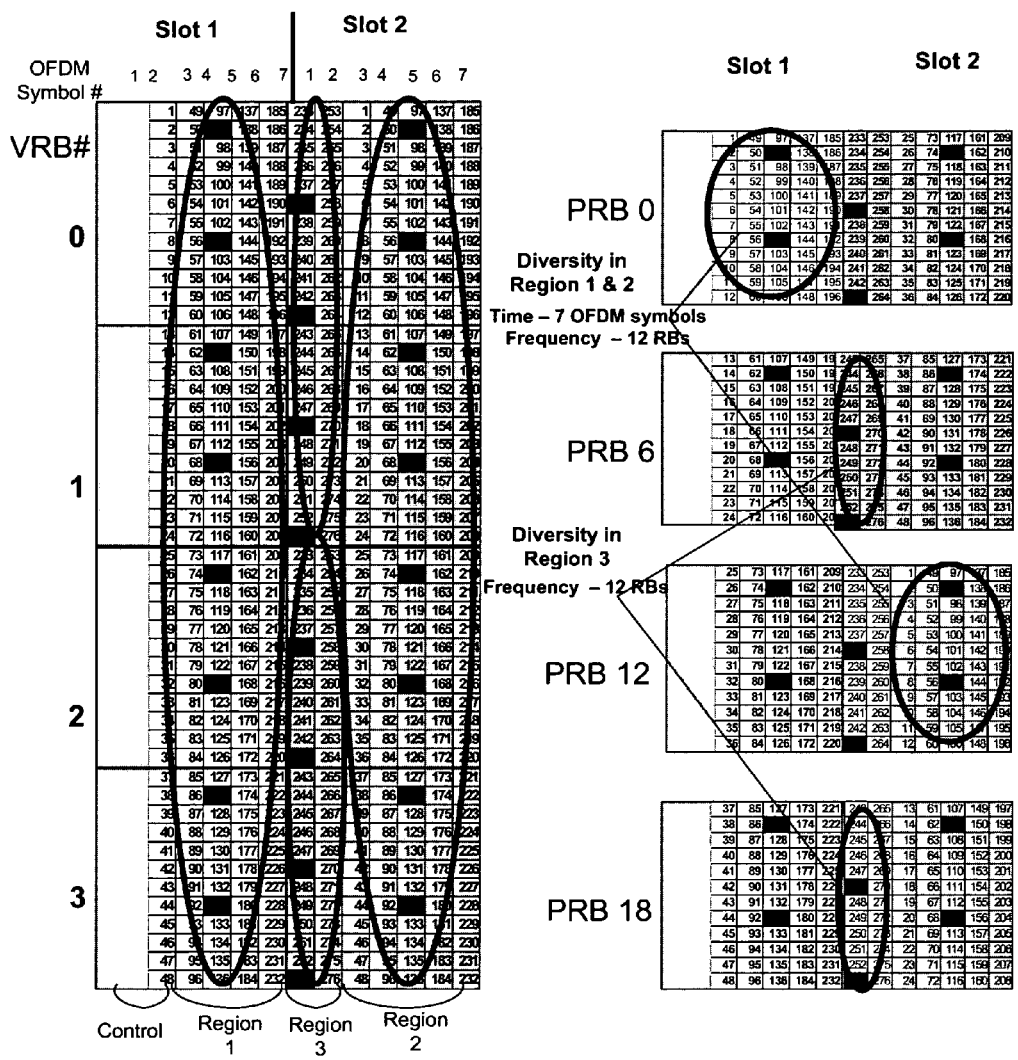
FIG. 12 is a detailed illustration of mapping virtual resource blocks to the physical resource blocks according to the present invention with each portion of each group being mapped to different physical resource block.

Another example of the proposed mapping is shown in FIG. 12 in more detail. Accordingly, each portion of each group is mapped into different physical resource block. The corresponding ordering of the portions belonging to the same group can be seen.

Figure 13:
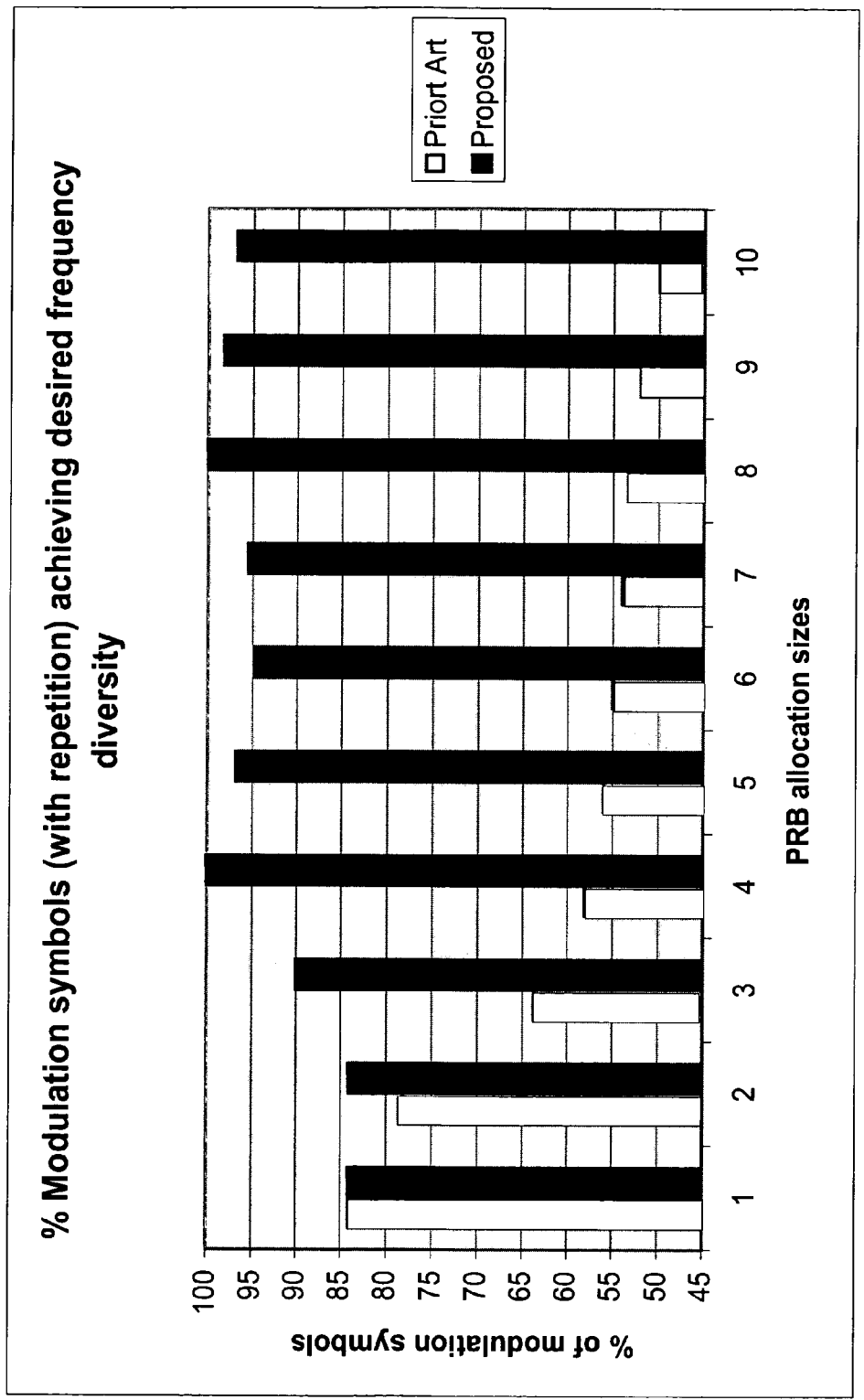
FIG. 13 is a graph showing benefits of the present invention in comparison to the state of the art in terms of achieving desired frequency diversity.

A comparison between the prior art and the mapping in accordance with the present invention in terms of achieving frequency gap in the LTE system is shown in FIG. 13. Achieving of the frequency gap is given in this case by the ratio (in %) of the pairs of corresponding original and repeated symbols that achieve the desired frequency gap of 12. The PRB allocation size refers to the number of PRB pairs allocated.

Figure 14:
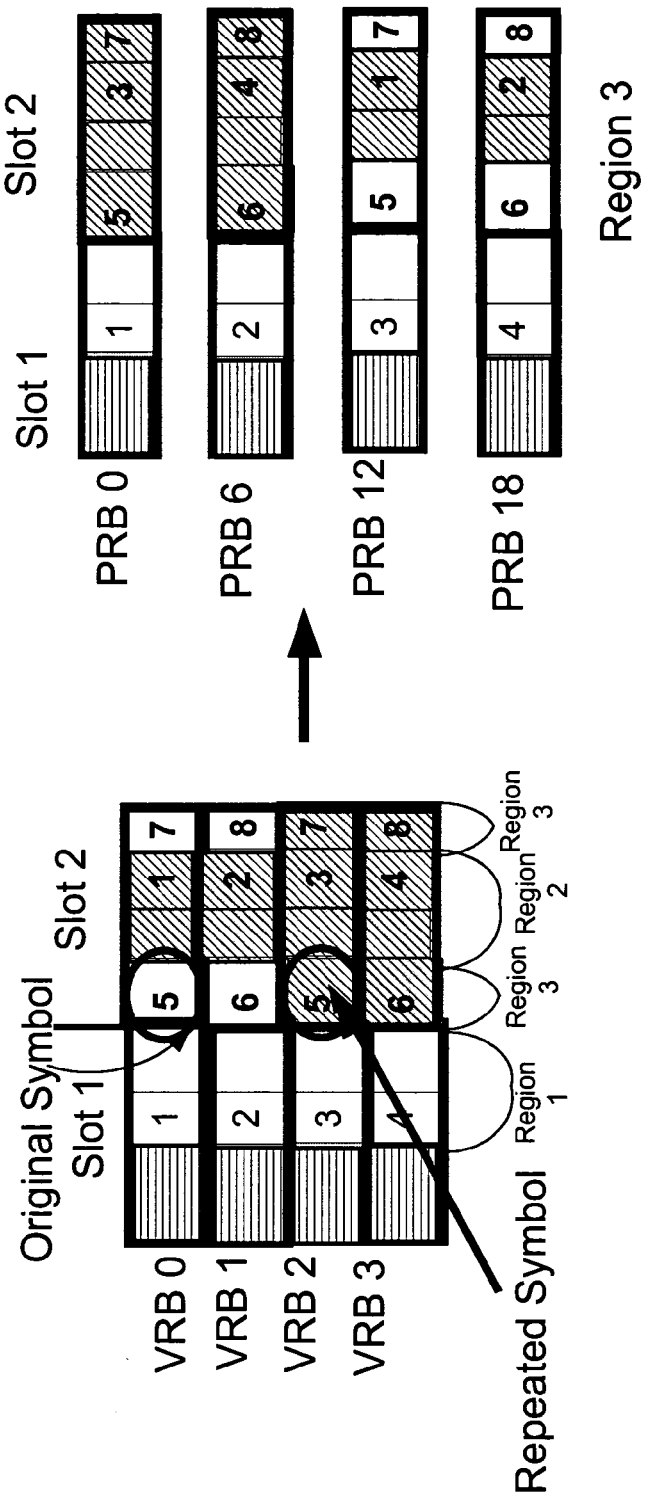
FIG. 14 is a schematic drawing illustrating mapping of the third region with splitting.

The third region can alternatively be split within the second time slot and mapped as shown in FIG. 14. In the figure, the corresponding original and repeated data symbols forming the same group and belonging to the third region have the same number (e.g. 5, 6, 7, 8). The repeated data symbols are distinguished by hatching. Accordingly, the data symbols of the second region are mapped onto a position within the second time slot different from the position of the first region-data symbols in the first time slot. The third region can then be mapped onto the remaining OFDM symbols in a split manner without affecting the properties of all three regions. This also improves the time diversity for original and repeated symbols in the third region.

Figure 15:
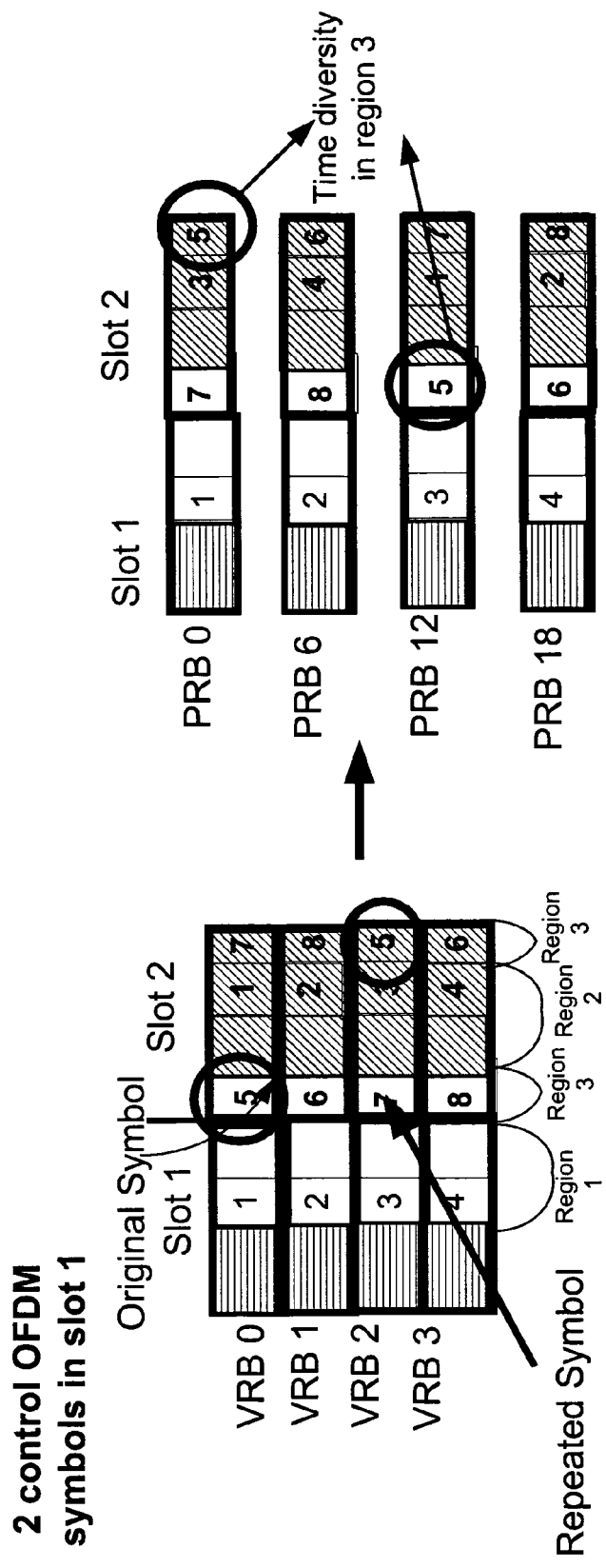
FIG. 15 is a schematic drawing illustrating mapping of the third region with splitting wherein a group in mapped on different time positions within the second virtual resource block.

Depending on the PRB allocation size and number of the control OFDM symbols, the interleaving of the third region can be slightly modified if used with splitting as shown in FIG. 15. The spacing of two VRBs should, however, be maintained between the original and repeated symbol blocks if the mapping according to LTE is used.

Figure 16:
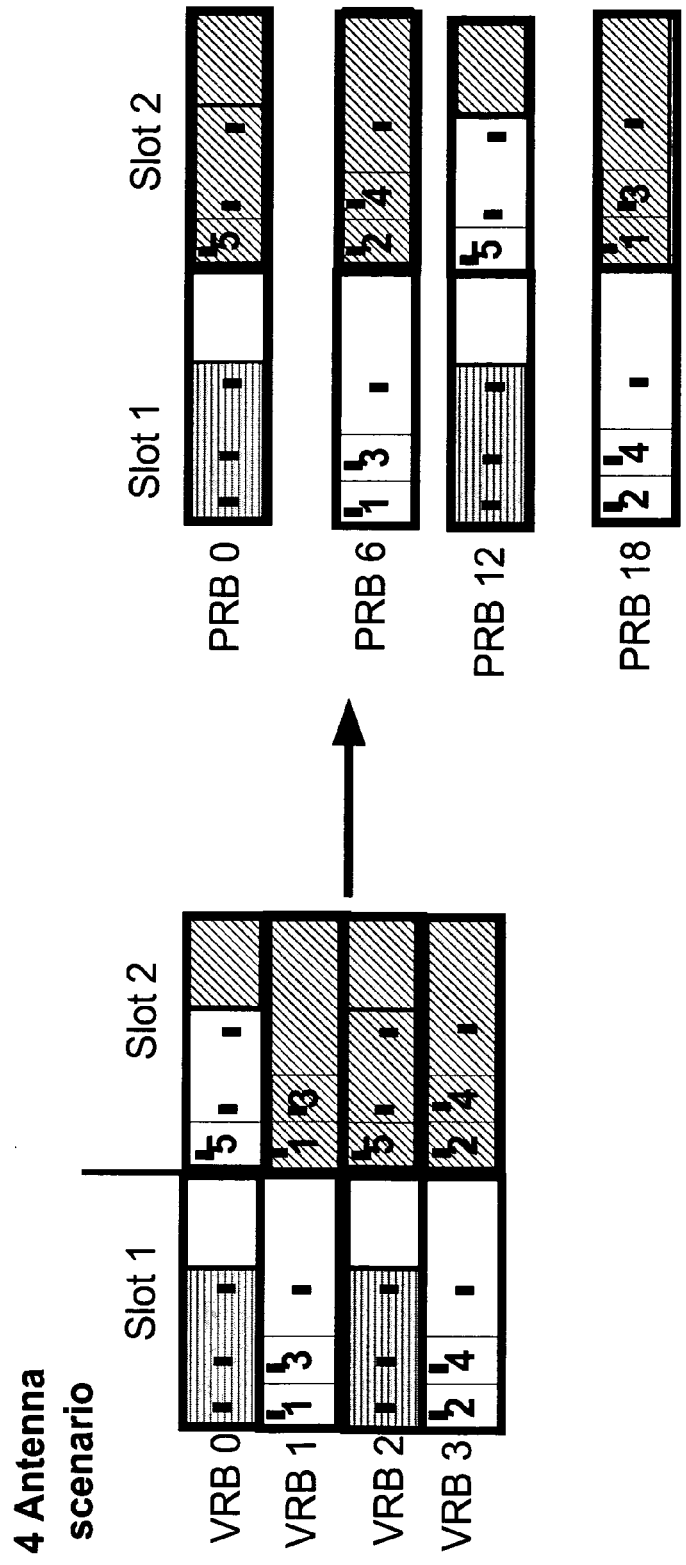
FIG. 16 is a schematic drawing illustrating an alternative mapping of control symbols.

In case where the control symbols in the first time slot are time division multiplexed as shown in FIG. 16, the third region shall have a structure similar to that of the control symbols and hence the proposed mapping rule would result in that structure, too. Thus, all the properties of the three regions are retained.

One of the key LTE features is the separation of hopping physical resource blocks by a distance of the half of the system bandwidth. This corresponds, for the 5 MHz system to the twelve physical resource blocks. The present invention maximises the frequency diversity for the data symbols with repetition. In other words, the maximum/desired diversity is achieved when original and repeated data symbols are mapped on the same VRB pair and hopped/distributed.

Figure 17:
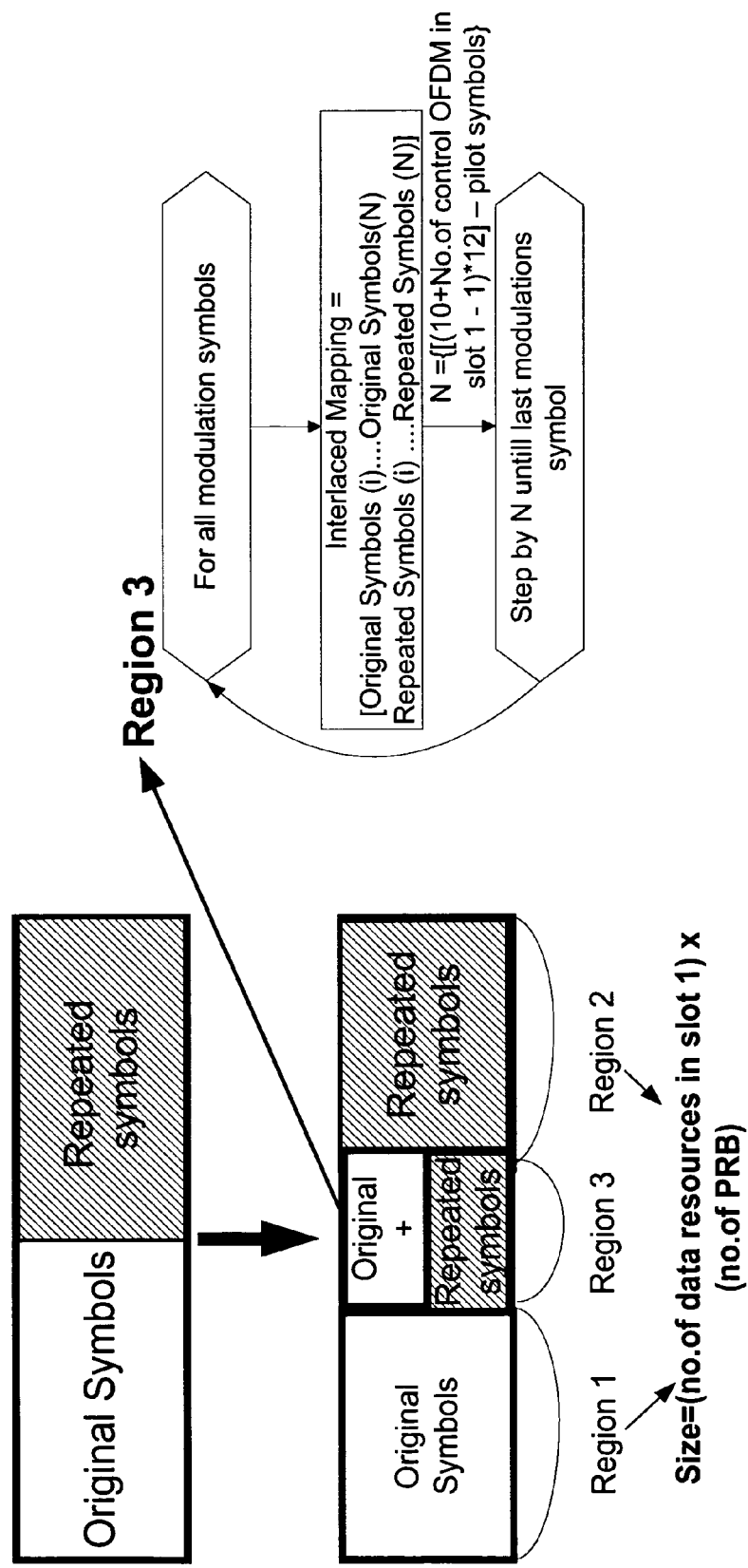
FIG. 17 is a schematic drawing showing an implementation of symbol reordering in accordance with the present invention.

The design of the three regions corresponding to forming the groups could be achieved (implemented) by a simple re-ordering of modulation symbols as shown in FIG. 17. Such simple implementation is beneficial since it does not increase the complexity of the corresponding transmitter and receiver working in accordance with such embodiment of the present invention.

Figure 18:
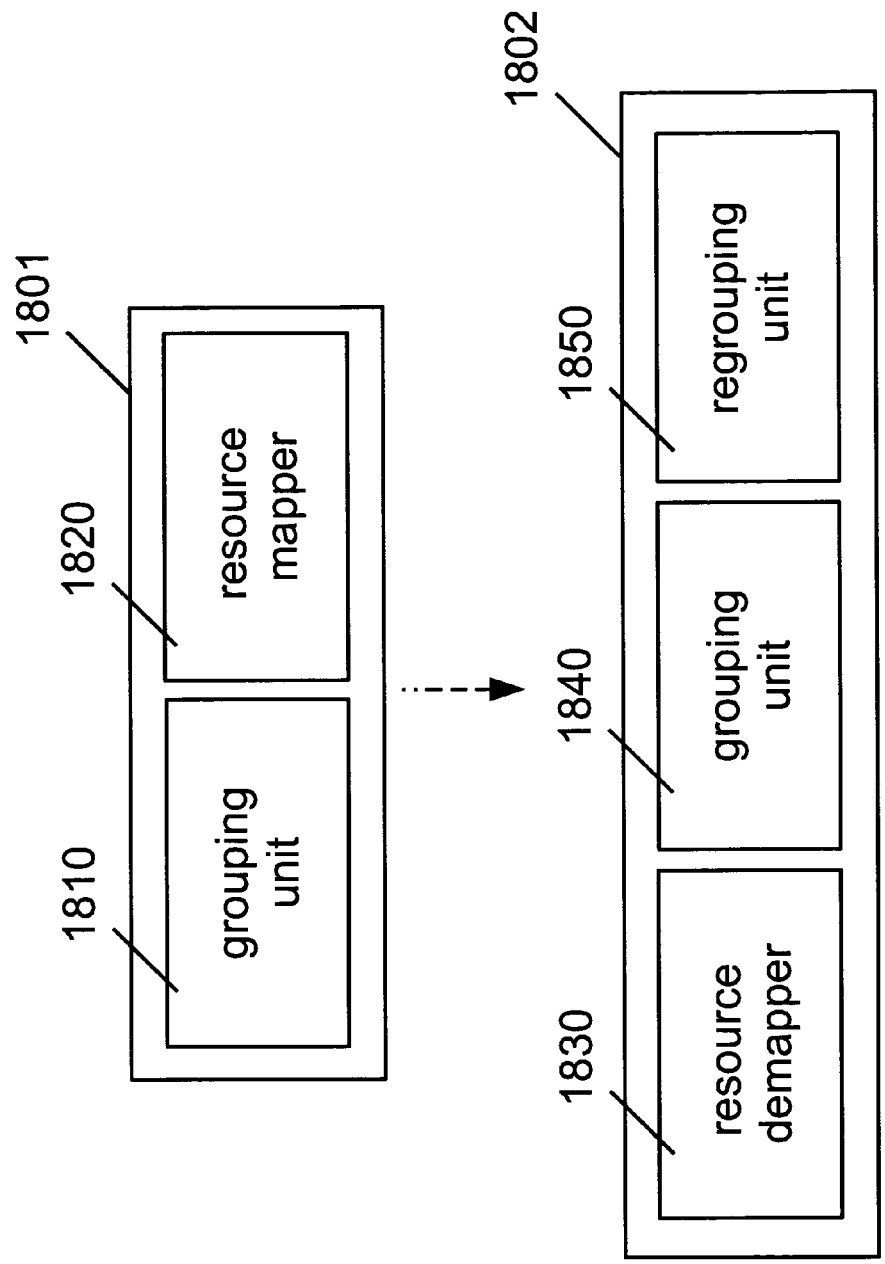
FIG. 18 is a block diagram illustrating a transmitter and a receiver in accordance with the present invention.
Figure 19:
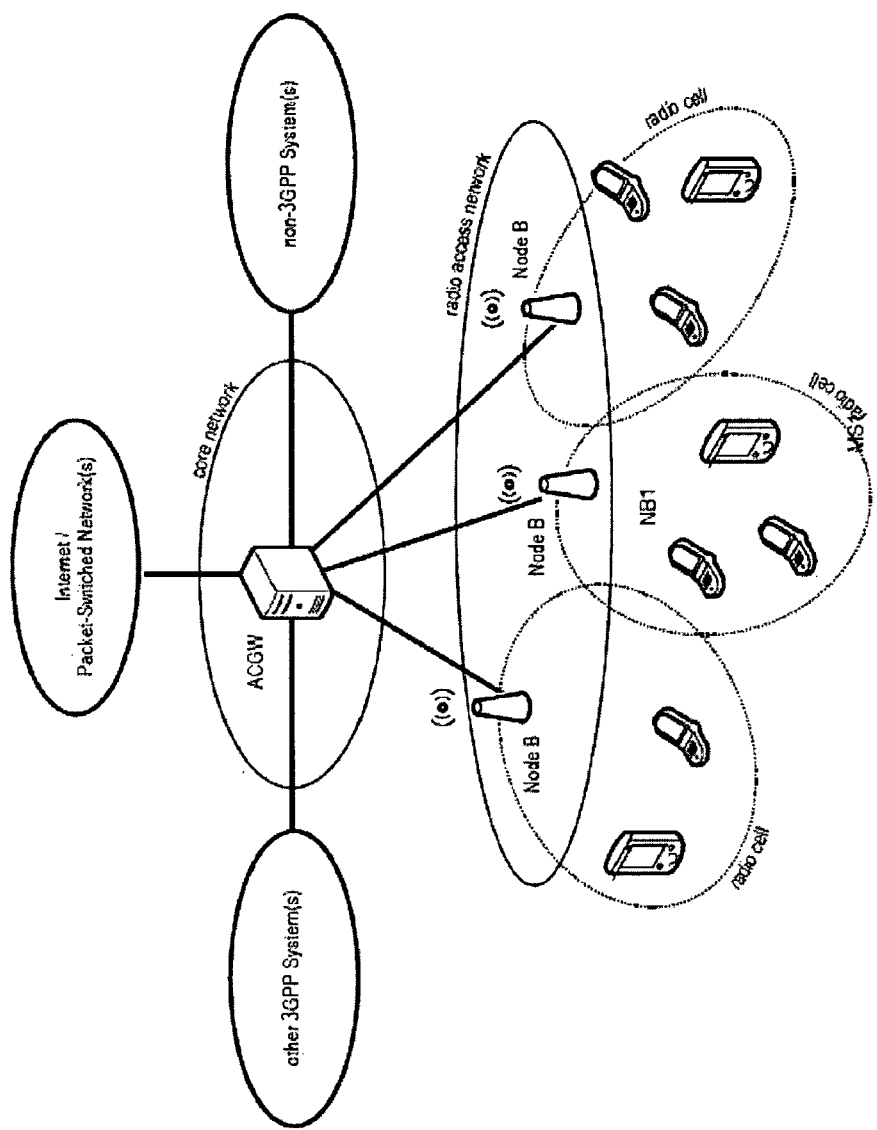
FIG. 19 is a schematic drawing illustrating 3GPP LTE architecture.

A block diagram of a transmitter 1801 and a receiver 1802 according to the present invention is shown in FIG. 18. The state of the art resource block mapping 700 is in accordance with the present invention replaced with a grouping unit 1810 for performing subdivision of the data symbols into groups and with a resource mapper 1820 for performing the mapping of the groups into the physical resource blocks. According to an embodiment of the present invention apart from the grouping unit and the resource mapper, the transmitter may further comprise a radio transmitting unit for processing and transmitting data in accordance with a radio transmission technology used. Such radio transmitting unit further includes, for instance, an encoder for encoding data, a scrambler, a modulator, a MIMO processing unit, and a signal generator. The transmitter may further be adapted to perform functions in conformance with a standard such as 3GPP LTE as described in the background section.

The receiver 1802 in accordance with the present invention comprises a resource demapper 1803 for demapping the data symbols belonging to portions of original and/or repeated data symbols from different physical resource blocks. The receiver 1802 further comprises a grouping unit 1840 for forming groups out of the corresponding portions of original and repeated data symbols. Further comprised is a regrouping unit 1850 for regrouping the portions of corresponding original and repeated data symbols to the original and repeated data symbols. The receiver may further comprise a radio receiving unit capable of receiving and processing the signals in accordance with the radio technology used. It comprises, for instance, a signal sampler, a MIMO processing, a demodulator, a descrambler, a decoder, etc. The receiver according to another embodiment of the present invention is conform with a standard such as 3GPP LTE and thus, capable of performing the processing necessary for reception of the data sent within the LTE mobile communication system as described in the background section.

In accordance with yet another embodiment of the present invention, the transmitter is a Node B and the receiver is one of a mobile terminal, a PC card, or a PDA. It should be noted that these are only examples of transmitters and receivers. In general, a mobile terminal, a PC card, or a PDA may be receivers and Node B a transmitter, another entities included in a mobile communication system may implement the receiver and/or the transmitter according to the present invention. An apparatus in accordance with the present invention may also comprise both, the transmitter and the receiver parts according to any embodiment of the present invention.

The reordered modulation symbols when mapped onto resource elements as specified in the LTE Release 8 shall then fulfil the mapping rule in different system configurations (scenarios) such as FDD and TDD systems, single antenna and MIMO transmissions, normal cyclic prefix and extended cyclic prefix, etc.

The case of filling the modulation symbols first along the frequency domain and then along the time domain has been illustrated in the above examples. However, the present invention is also applicable and achieves the same benefits for the case where the modulation symbols are filled first along the time domain and then along the frequency domain (filling the symbols the first row, then pass to the second row, the row representing portions of different OFDM symbols at one subcarrier).

The number of control symbols in the first time slot may vary. The three regions can be designed accordingly as described.

If an appropriate interleaving of modulated data symbols is applied, the standard resource block mapping function of LTE could be re-used.

Another embodiment of the invention relates to the implementation of the above described various embodiments using hardware and software. It is recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

Most of the examples have been outlined in relation to a 3GPP-based communication system, in particular LTE, and the terminology mainly relates to the 3GPP terminology. However, the terminology and the description of the various embodiments with respect to 3GPP-based architectures is not intended to limit the principles and ideas of the inventions to such systems.

Also the detailed explanations of the resource mapping in the LTE are intended to better understand the mostly 3GPP specific exemplary embodiments described herein and should not be understood as limiting the invention to the described specific implementations of processes and functions in the mobile communication network. Nevertheless, the improvements proposed herein may be readily applied in the architectures described. Furthermore the concept of the invention may be also readily used in the LTE RAN (Radio Access Network) currently discussed by the 3GPP.

Summarizing, the present invention provides a method and an apparatus for transmitting of symbols with repetition over a mobile communication system in the form of physical resource blocks. In accordance with the present invention, the original and the corresponding repeated symbols are subdivided into groups and each group is mapped to physical resource blocks. The desired level of diversity between the corresponding original and repeated data symbols is met by mapping the part of the original symbols of the group to a physical resource block different from the physical resource block on which the part of the repeated symbols of the same group is mapped.

The invention claimed is:

1. A method for transmitting a block of symbols using a plurality of physical resource blocks of a radio channel in a mobile communication system, the block of symbols comprising data symbols which include original data symbols and repeated data symbols and at least one control symbol, each repeated data symbol corresponding to an original data symbol, the physical resource block being specified by at least one of transmission slot, subband frequency, code and radiation pattern, the method comprising the steps of:
   subdividing the data symbols into a plurality of groups, each group including a first portion of the original data symbols and a second portion of the corresponding repeated data symbols;
   mapping the data symbols of each portion of a group into different physical resource blocks; and
   mapping the at least one control symbol into the same physical resource block as the first portion of the original data symbols of one of the plurality of groups; wherein the number of data symbols in said group is determined based on the number of said at least one control symbol.

2. A method according to claim 1 wherein the corresponding original and repeated data symbols mapped into different physical resource blocks meet a predefined level of diversity.

3. A method according to claim 1 wherein for a group, the ordering of the repeated data symbols of the second portion mapped into a second physical resource block is the same as the ordering of the corresponding original data symbols of the first portion mapped into a first physical resource block.

4. A method according to claim 1 wherein
   the physical resource blocks are defined by a time slot and a predefined number of subcarriers;
   the first and the second portions of a first group are mapped into different time slots; and
   the first and the second portions of the remaining groups of the plurality of groups are mapped into the same time slots.

5. A method according to claim 1 wherein the mobile communication system is the 3GPP Long Term Evolution system.

6. A method according to claim 1 wherein distributed mapping of virtual resource block pairs onto physical resource blocks pairs is applied, wherein each pair of virtual resource blocks includes a first virtual resource block in a first time slot and a second virtual resource block in a second time slot, each pair of virtual resource blocks is addressed by a common index in frequency domain, the first virtual resource block is mapped on a first physical resource block and the second virtual resource block is mapped on a second physical resource block, the first and the second physical resource blocks are separated in frequency by a predefined frequency gap and are mapped into different time slots.

7. A method according to claim 6 wherein
   the first portion of the original data symbols of a first group is mapped into the first virtual resource block of a first virtual resource block pair;
   the second portion of the repeated data symbols of the first group is mapped into the second virtual resource block of the virtual resource block pair;
   the first portion of the original data symbols of a second group is mapped into the second virtual resource block of a first virtual resource block pair; and
   the second portion of the repeated data symbols of the second group is mapped into the second virtual resource block of a second virtual resource block pair.

8. A method according to claim 6 wherein the second portion of the repeated data symbols of a group other than the first group is mapped into same position within time slot as the first portion of the original data symbols of said group.

9. A transmitter for transmitting a block of symbols using a plurality of physical resource blocks of a radio channel in a mobile communication system, the block of symbols comprising data symbols which include original data symbols and repeated data symbols and at least one control symbol, each repeated data symbol corresponding to an original data symbol, the physical resource block being specified by at least one of transmission slot, subband frequency, code and radiation pattern, the transmitter comprising:
   a grouping unit for subdividing the data symbols into a plurality of groups, each group including a first portion of the original data symbols and a second portion of the corresponding repeated data symbols and for determining the number of the data symbols in said group based on the number of said at least one control symbol; and
   a resource mapper for mapping the data symbols of each portion of a group into different physical resource blocks and for mapping the at least one control symbol into the same physical resource block as the first portion of the original data symbols of one of the plurality of groups.

10. A transmitter according to claim 9 wherein the corresponding original and repeated data symbols mapped into different physical resource blocks meet a predefined level of diversity.

11. A transmitter according to claim 9 wherein for a group, the ordering of the repeated data symbols of the second portion mapped into a second physical resource block is the same as the ordering of the corresponding original data symbols of the first portion mapped into a first physical resource block.

12. A transmitter according to claim 9 wherein
   the physical resource blocks are defined by a time slot and a predefined number of subcarriers;
   the resource mapper is adapted to map the first and the second portions of a first group into different time slots and to map the first and the second portions of the remaining groups of the plurality of groups into the same time slots.

13. A transmitter according to claim 9 wherein the mobile communication system is the 3GPP Long Term Evolution system.

14. A transmitter according to claim 9 wherein the resource mapper is adapted to perform distributed mapping of virtual resource block pairs onto physical resource blocks pairs, wherein each pair of virtual resource blocks includes a first virtual resource block in a first time slot and a second virtual resource block in a second time slot, each pair of virtual resource blocks is addressed by a common index in frequency domain, the first virtual resource block is mapped on a first physical resource block and the second virtual resource block is mapped on a second physical resource block, the first and the second physical resource blocks are separated in frequency by a predefined frequency gap and are mapped into different time slots.

15. A transmitter according to claim 14 wherein the resource mapper is adapted to:
   map the first portion of the original data symbols of a first group into the first virtual resource block of a first virtual resource block pair;

map the second portion of the repeated data symbols of the first group into the second virtual resource block of the virtual resource block pair;

map the first portion of the original data symbols of a second group into the second virtual resource block of a first virtual resource block pair; and map the second portion of the repeated data symbols of the second group into the second virtual resource block of a second virtual resource block pair.

16. A transmitter according to claim 14 wherein the resource mapper is adapted to map the second portion of the repeated data symbols of a group other than the first group into same position within time slot as the first portion of the original data symbols of said group.

17. A method for receiving a block of symbols transmitted using a plurality of physical resource blocks of a radio channel in a mobile communication system, the block of symbols comprising data symbols which include original data symbols and repeated data symbols and at least one control symbol, each repeated data symbol corresponding to an original data symbol, the physical resource block being specified by at least one of transmission slot, subband frequency, code and radiation pattern, the method comprising the steps of:

demapping the data symbols from different physical resource blocks, wherein each resource block includes at least one of a first portion of the original data symbols and a second portion of the repeated data symbols;

demapping the at least one control symbol from the same physical resource block as the first portion of the original data symbols of one of the plurality of groups;

grouping a first portion of the original data symbols with a second portion of the corresponding repeated data symbols in a group, wherein the number of data symbols in said group is determined based on the number of said at least one control symbol; and regrouping the original data symbols and the repeated data symbols of a plurality of groups into original data symbols and repeated data symbols.

18. A receiver for receiving a block of symbols transmitted using a plurality of physical resource blocks of a radio channel in a mobile communication system, the block of symbols comprising data symbols which include original data symbols and repeated data symbols and at least one control symbol, each repeated data symbol corresponding to an original data symbol, the physical resource block being specified by at least one of transmission slot, subband frequency, code and radiation pattern, the receiver comprising:

a demapper for demapping the data symbols from different physical resource blocks, wherein each resource block includes at least one of a first portion of the original data symbols and a second portion of the repeated data symbols and for demapping the at least one control symbol from the same physical resource block as the first portion of the original data symbols of one of the plurality of groups;

a grouping unit for grouping a first portion of the original data symbols with a second portion of the corresponding repeated data symbols in a group and for determining the number of the data symbols in said group based on the number of said at least one control symbol; and a regrouping unit for regrouping the original data symbols and the repeated data symbols of a plurality of groups into original data symbols and repeated data symbols.

* * * * *